(12) United States Patent
Daussin

(10) Patent No.: US 9,038,725 B2
(45) Date of Patent: May 26, 2015

(54) METHOD AND SYSTEM FOR SERVICING A WELLBORE

(75) Inventor: Rory Dennis Daussin, Spring, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 370 days.

(21) Appl. No.: 13/545,828

(22) Filed: Jul. 10, 2012

(65) Prior Publication Data

US 2014/0014344 A1    Jan. 16, 2014

(51) Int. Cl.
*C02F 1/32* (2006.01)
*E21B 43/25* (2006.01)
*E21B 43/26* (2006.01)

(52) U.S. Cl.
CPC ............... *E21B 43/25* (2013.01); *C02F 1/325* (2013.01); *E21B 43/26* (2013.01)

(58) Field of Classification Search
CPC ......... E21B 43/25; E21B 43/26; E21B 43/20; E21B 21/06; G21K 5/00; C02F 1/688; C02F 1/32; C02F 2201/008; C02F 1/001; C02F 1/325; C09K 8/66; B01F 1/0038; B01F 1/0027
USPC .......... 166/305.1, 90.1; 210/748.11, 206, 749
See application file for complete search history.

(56) References Cited

U.S. PATENT DOCUMENTS

| 3,193,448 | A | 7/1965 | Buckman et al. |
| 3,259,190 | A | 7/1966 | Parsons |
| 3,510,406 | A | 5/1970 | Stack, Jr. |
| 3,664,638 | A | 5/1972 | Grout et al. |
| 3,994,772 | A | 11/1976 | Swered et al. |
| 4,141,830 | A | 2/1979 | Last |
| 4,202,412 | A | 5/1980 | Ruskin |
| 4,230,571 | A | 10/1980 | Dadd |
| 4,273,660 | A | 6/1981 | Beitzel |
| 4,480,696 | A | 11/1984 | Almond et al. |
| 4,519,455 | A | 5/1985 | Holtmyer et al. |
| 4,540,052 | A | 9/1985 | Hitzman |
| 4,554,082 | A | 11/1985 | Holtmyer et al. |

(Continued)

FOREIGN PATENT DOCUMENTS

| CA | 2785074 A1 | 7/2011 |
| CA | 2733135 A1 | 9/2011 |

(Continued)

OTHER PUBLICATIONS

Foreign communication from a related counterpart application—Canadian Office Action, CA Application No. 2,785,074, Dec. 11, 2013, 3 pages.

(Continued)

*Primary Examiner* — Yong-Suk (Philip) Ro
(74) *Attorney, Agent, or Firm* — John W. Wustenberg; Baker Botts L.L.P.

(57) ABSTRACT

A method of servicing a wellbore that includes, transporting a fluid treatment system to a wellsite, accessing a water source proximate to the wellsite, introducing a water stream from the water source into the fluid treatment system, irradiating at least a portion of the water stream within the fluid treatment system, forming a wellbore servicing fluid from the irradiated water stream, and placing the wellbore servicing fluid into the wellbore. The portion of the water stream is irradiating by exposing the portion of water stream to ultraviolet light emitted from at least one pulsed ultraviolet lamp.

20 Claims, 8 Drawing Sheets

(56) References Cited

U.S. PATENT DOCUMENTS

| | | | |
|---|---|---|---|
| RE32,302 E | 12/1986 | Almond et al. |
| 4,752,401 A | 6/1988 | Bodenstein |
| 4,799,550 A | 1/1989 | Harris et al. |
| 4,997,576 A | 3/1991 | Heller et al. |
| 5,165,479 A | 11/1992 | Harris et al. |
| 5,178,755 A | 1/1993 | LaCrosse |
| 5,180,499 A | 1/1993 | Hinson et al. |
| 5,227,053 A | 7/1993 | Brym |
| 5,256,299 A | 10/1993 | Wang et al. |
| 5,322,623 A | 6/1994 | Benskin et al. |
| 5,370,845 A | 12/1994 | Miller et al. |
| 5,372,732 A | 12/1994 | Harris et al. |
| 5,387,400 A | 2/1995 | Pelster |
| 5,393,810 A | 2/1995 | Harris et al. |
| 5,439,059 A | 8/1995 | Harris et al. |
| 5,514,278 A | 5/1996 | Khudenko |
| 5,536,400 A | 7/1996 | Schultz |
| 5,675,153 A | 10/1997 | Snowball |
| 5,728,303 A | 3/1998 | Johnson |
| 5,741,426 A | 4/1998 | McCabe et al. |
| 5,762,808 A | 6/1998 | Peyton |
| 5,779,912 A | 7/1998 | Gonzalez-Martin et al. |
| 5,798,047 A | 8/1998 | Tekawa |
| 5,935,431 A | 8/1999 | Korin |
| 5,990,052 A | 11/1999 | Harris |
| 6,024,170 A | 2/2000 | McCabe et al. |
| 6,030,526 A | 2/2000 | Porter |
| 6,054,097 A | 4/2000 | Mass et al. |
| 6,090,296 A | 7/2000 | Oster |
| 6,214,773 B1 | 4/2001 | Harris et al. |
| 6,662,956 B2 | 12/2003 | Levy |
| 6,719,894 B2 | 4/2004 | Gavrel et al. |
| 6,782,735 B2 | 8/2004 | Walters et al. |
| 6,794,340 B2 | 9/2004 | Nguyen et al. |
| 6,796,436 B2 | 9/2004 | Whitehill et al. |
| 6,824,695 B2 | 11/2004 | Tempest, Jr. |
| 6,884,355 B2 | 4/2005 | Kamiya et al. |
| 6,893,559 B2 | 5/2005 | Kin et al. |
| 6,902,678 B2 | 6/2005 | Tipton |
| 6,921,476 B2 | 7/2005 | Abe et al. |
| 6,932,903 B2 | 8/2005 | Chang |
| 6,945,329 B2 | 9/2005 | Harris et al. |
| 6,960,301 B2 | 11/2005 | Bradley |
| 7,029,587 B2 | 4/2006 | Andrews |
| 7,036,597 B2 | 5/2006 | O'Brien et al. |
| 7,063,154 B2 | 6/2006 | Wilson et al. |
| 7,211,543 B2 | 5/2007 | Nakabayash |
| 7,225,874 B2 | 6/2007 | Harris et al. |
| 7,264,054 B2 | 9/2007 | Harris et al. |
| 7,279,093 B2 | 10/2007 | Kin et al. |
| 7,288,498 B1 | 10/2007 | Levy |
| 7,297,665 B2 | 11/2007 | Harris et al. |
| 7,306,040 B1 | 12/2007 | Robb et al. |
| 7,316,808 B2 | 1/2008 | Candau |
| 7,332,094 B2 | 2/2008 | Abney et al. |
| 7,381,686 B2 | 6/2008 | Lin et al. |
| 7,390,417 B2 | 6/2008 | Kuhlmann et al. |
| 7,442,313 B2 | 10/2008 | Kerfoot |
| 7,462,288 B2 | 12/2008 | Ried |
| 7,563,939 B2 | 7/2009 | Denton |
| 7,663,259 B2 | 2/2010 | Baarman et al. |
| 7,663,751 B1 | 2/2010 | Mitchell |
| 7,678,744 B2 | 3/2010 | Abney et al. |
| 7,699,988 B2 | 4/2010 | McGuire et al. |
| 7,731,843 B2 | 6/2010 | Pinchin |
| 7,770,643 B2 | 8/2010 | Daussin |
| 7,802,623 B2 | 9/2010 | Lunde et al. |
| 7,825,073 B2 | 11/2010 | Welton et al. |
| 7,837,849 B2 | 11/2010 | Carrier et al. |
| 7,842,641 B2 | 11/2010 | Fu et al. |
| 7,896,072 B2 | 3/2011 | Daussin et al. |
| 7,906,023 B2 | 3/2011 | Johnson |
| 8,012,355 B2 | 9/2011 | Johnson |
| 8,048,279 B2 | 11/2011 | Powell et al. |
| 8,084,394 B2 | 12/2011 | Steffen |
| 8,119,008 B2 | 2/2012 | Heiss |
| 8,154,419 B2 | 4/2012 | Daussin et al. |
| 8,276,760 B2 | 10/2012 | Lean et al. |
| 8,372,789 B2 | 2/2013 | Harris et al. |
| 2005/0103717 A1 | 5/2005 | Jha et al. |
| 2005/0269254 A1 | 12/2005 | Roitman |
| 2006/0108270 A1 | 5/2006 | Kosanda et al. |
| 2006/0157425 A1 | 7/2006 | Rice et al. |
| 2006/0243670 A1* | 11/2006 | Pinchin ............... 210/748 |
| 2007/0037713 A1 | 2/2007 | Harris et al. |
| 2007/0056913 A1 | 3/2007 | Burt |
| 2007/0102359 A1 | 5/2007 | Lombardi et al. |
| 2007/0281870 A1 | 12/2007 | Robb et al. |
| 2008/0008632 A1 | 1/2008 | Engelhard |
| 2008/0128331 A1 | 6/2008 | Lean et al. |
| 2008/0230458 A1 | 9/2008 | Lean et al. |
| 2009/0050538 A1 | 2/2009 | Lean et al. |
| 2009/0107915 A1 | 4/2009 | Skinner et al. |
| 2009/0114601 A1 | 5/2009 | Lean et al. |
| 2009/0114607 A1 | 5/2009 | Lean et al. |
| 2009/0175757 A1 | 7/2009 | Yao et al. |
| 2009/0230059 A1* | 9/2009 | McGuire et al. ......... 210/638 |
| 2010/0000948 A1* | 1/2010 | Park et al. ............. 210/748 |
| 2010/0140107 A1 | 6/2010 | Sloan |
| 2010/0181070 A1 | 7/2010 | Harris et al. |
| 2010/0297000 A1 | 11/2010 | Campbell |
| 2011/0163046 A1 | 7/2011 | Neal et al. |
| 2011/0166046 A1 | 7/2011 | Weaver et al. |
| 2011/0166049 A1 | 7/2011 | Haggstrom et al. |
| 2011/0220371 A1 | 9/2011 | Daussin et al. |
| 2011/0272155 A1 | 11/2011 | Warren |
| 2012/0070339 A1 | 3/2012 | Lawal |
| 2012/0181014 A1 | 7/2012 | Daussin et al. |
| 2012/0181028 A1 | 7/2012 | Daussin et al. |

FOREIGN PATENT DOCUMENTS

| | | |
|---|---|---|
| EP | 1613149 A2 | 1/2006 |
| FR | 2868415 A1 | 10/2005 |
| GB | 2404189 B | 11/2005 |
| WO | 8809772 A1 | 12/1988 |
| WO | 0055096 A1 | 9/2000 |
| WO | 0061505 A1 | 10/2000 |
| WO | 03091167 A1 | 11/2003 |
| WO | 2004089075 A2 | 10/2004 |
| WO | 2004089075 A3 | 10/2004 |
| WO | 2004090284 A1 | 10/2004 |
| WO | 2004099532 A1 | 11/2004 |
| WO | 2007066070 A1 | 6/2007 |
| WO | 2009127870 A2 | 10/2009 |
| WO | 2009127870 A3 | 10/2009 |
| WO | 2011083308 A1 | 7/2011 |
| WO | 2011083308 A8 | 7/2011 |
| WO | 2011119950 A2 | 9/2011 |
| WO | 2011119950 A3 | 9/2011 |
| WO | 2011138575 A2 | 11/2011 |

OTHER PUBLICATIONS

Advisory Action dated Feb. 14, 2014 (3 pages), U.S. Appl. No. 12/683,337, filed Jan. 6, 2010.
Office Action dated Mar. 12, 2014 (19 pages), U.S. Appl. No. 12/683,337, filed Jan. 6, 2010.
Office Action (Final) dated Dec. 13, 2013 (20 pages), U.S. Appl. No. 12/683,337, filed Jan. 6, 2010.
Advisory Action dated Feb. 20, 2014 (3 pages), U.S. Appl. No. 12/683,343, filed Jan. 6, 2010.
Filing receipt and specification for patent application entitled "System and Method for Fluid Treatment," by Wesley J. Warren, filed May 13, 2014 as U.S. Appl. No. 14/276,686.
Office Action dated Sep. 9, 2013 (18 pages), U.S. Appl. No. 12/722,410, filed Mar. 11, 2010.
Office Action dated Aug. 5, 2013 (38 pages), U.S. Appl. No. 12/774,393, filed May 5, 2010.
Office Action (Final) dated Sep. 9, 2013 (21 pages), U.S. Appl. No. 13/007,363, filed Jan. 14, 2011.
Office Action (Final) dated Sep. 11, 2013 (21 pages), U.S. Appl. No. 13/007,369, filed Jan. 14, 2011.

(56) References Cited

OTHER PUBLICATIONS

Office Action dated Aug. 2, 2013 (21 pages), U.S. Appl. No. 12/683,337, filed Jan. 6, 2010.
Office Action dated Aug. 2, 2013 (22 pages), U.S. Appl. No. 12/683,343, filed Jan. 6, 2010.
Foreign communication from a related counterpart application—Canadian Office Action, CA Application No. 2,785,074, Mar. 14, 2013, 3 pages.
Advisory Action dated Jan. 22, 2013 (3 pages), U.S. Appl. No. 12/722,410, filed Mar. 11, 2010.
Office Action (Restriction Requirement) dated Apr. 18, 2013 (7 pages), U.S. Appl. No. 12/774,393, filed May 5, 2010.
Baumann, Frank J., "Dichromate reflux chemical oxygen demand," Aug. 1974, pp. 1336-1338, vol. 46, No. 9, Analytical Chemistry.
Buhts, Robert E., et al., "Evaluation of ultraviolet/ozone treatment of Rocky Mountain Arsenal (RMA) groundwater (treatability study)," AD-A052 339, Technical Report Y-78-1, Jan. 1978, pp. I, i, ii, 1-36, A-1 to A-3 plus 1 cover page, prepared for The Project Manager for Chemical Demilitarization and Installation Restoration Aberdeen Proving Ground, Maryland 21020.
Couch, Ben, "The ozone/UV combination," http://www.wqpmag.com/The-Ozone-UV-Combination—article7629, Water Quality Products, Feb. 2007, 5 pages, vol. 12, No. 2, © 2009 Scranton Gillette Communications.
Gloe, Lindsey, et al., "UV light reduces the amount of biocide required to disinfect water for fracturing fluids," SPE 125665, 2009, pp. 1-8, Society of Petroleum Engineers.
Ikehata, Keisuke, et al., "Degradation of recalcitrant surfactants in wastewater by ozonation and advanced oxidation processes: a review," Ozone: Science and Engineering, 2004, pp. 327-340 plus 3 pages of appendices, vol. 26, International Ozone Association.
Jirka, Andrea M., et al., "Micro semi-automated analysis of surface and wastewaters for chemical oxygen demand," Jul. 1975, pp. 1397-1402, vol. 47, No. 8, Analytical Chemistry.
Klasson, K. Thomas, et al., "Ozone treatment of soluble organics in produced water," Jan. 2002, 79 pages, prepared for the U.S. Department of Energy under contract DE-AC05-00OR22725.
Ku, Young, et al., "Decomposition kinetics of ozone in aqueous solution," Ind. Eng. Chem. Res., 1996, pp. 3369-3374, vol. 35, No. 10, American Chemical Society.
Ku, Young, et al., "Decompositon of phenols in aqueous solution by a UV/O3 process," Ozone Science & Engineering, 1996, pp. 443-460, vol. 18, International Ozone Association.
Kuo, Wen-Shiuh, "Destruction of toxic organics in water by an injection-type downflow UV/O3 oxidation reactor," Ozone Science & Engineering, 1999, pp. 539-550, vol. 21, International Ozone Association.
Liu, B. W., et al., "Evaluation of selected operational parameters for the decolorization of dye-finishing wastewater using UV/ozone," Ozone: Science and Engineering, 2004, pp. 239-245, vol. 26, International Ozone Association.
O'Dell, James W., "Method 180.1—determination of turbidity by nephelometry," Aug. 1993, pp. 180.1-1 to 180.1-10, Environmental Monitoring Systems Laboratory, Office of Research and Development, U.S. Environmental Protection Agency, Cincinnati, Ohio.
Paillard, H., et al., "Application of oxidation by a combined ozone/ultraviolet radiation system to the treatment of natural water," Ozone Science & Engineering, 1987, pp. 391-418, vol. 9, International Ozone Association.
Bohrerova, Zuzana, et al., "Comparative disinfection efficiency of pulsed and continuous-wave UV irradiation technologies," Water Research, 2008, pp. 2975-2982, vol. 42, Elsevier Ltd.
Code of Federal Regulations abstract entitled, "Part 179—Irradiation in the Production, Processing and Handling of Food," Apr. 1, 2011, 1 page, Title 21, vol. 3.
Foreign communication from a related counterpart application—International Search Report and Written Opinion, PCT/GB2011/000006, Feb. 16, 2011, 10 pages.
Lyn, D. A., et al., "Numerical Modeling of Flow and Disinfection in UV Disinfection Channels," Journal of Environmental Engineering, Jan. 1999, pp. 17-26, ASCE.
Mofidi, Alexander A., et al., "Disinfection Using High-Intensity Pulsed-Ultraviolet Irradiation," 1998, 25 pages, American Water Works Association.
Office Action dated Jun. 6, 2012 (25 pages), U.S. Appl. No. 12/722,410, filed Mar. 11, 2010.
Office Action dated Dec. 22, 2011 (23 pages), U.S. Appl. No. 12/683,337, filed Jan. 6, 2010.
Office Action dated Dec. 22, 2011 (17 pages), U.S. Appl. No. 12/683,343, filed Jan. 6, 2010.
Rodvelt, G., et al., "Case History: Challenges Using Ultraviolet Light to Control Bacteria in Marcellus Completions," SPE 149445, Aug. 2011, pp. 1-6, Society of Petroleum Engineers.
Schaefer, Raymond, et al., "Pulsed UV Lamp Performance and Comparison with UV Mercury Lamps," J. Environ. Eng. Sci., 2007, pp. 303-310, vol. 6, NRC Canada.
Wang, T., et al., "Pulsed ultra-violet inactivation spectrum of *Escherichia Coli*," Water Research, 2005, pp. 2921-2925, vol. 39, Elsevier Ltd.
Arthur, J. Daniel, et al., "Technical summary of oil & gas produced water treatment technologies," Mar. 2005, pp. 1-53, All Consulting, LLC.
Foreign communication from a related counterpart application—International Preliminary Report on Patentability, PCT/GB2011/000006, Jul. 10, 2012, 7 pages.
Foreign commmunication from a related counterpart application—Canadian Examination Report, CA 2,733,135, May 29, 2012, 3 pages.
Office Action (Final) dated Jun. 19, 2012 (17 pages), U.S. Appl. No. 12/683,337, filed Jan. 6, 2010.
Office Action (Final) dated Jun. 19, 2012 (14 pages), U.S. Appl. No. 12/683,343, filed Jan. 6, 2010.
Advisory Action dated Aug. 28, 2012 (3 pages), U.S. Appl. No. 12/683,337, filed Jan. 6, 2010.
Advisory Action dated Aug. 28, 2012 (3 pages), U.S. Appl. No. 12/683,343, filed Jan. 6, 2010.
Office Action (Final) dated Nov. 13, 2013 (17 pages), U.S. Appl. No. 12/774,393, filed May 5, 2010.
Brunner, H., et al., "Ultra-violet disinfection of injection seawater for secondary oil recovery," SPE 14007/1, XP-002683325, 1985, 11 pages, Society of Petroleum Engineers of AIME.
Foreign communication from a related counterpart application—International Search Report and Written Opinion, PCT/GB2011/000630, Oct. 5, 2012, 9 pages.
Hamouda, A. A., "Water injection quality in Ekofisk—UV sterilization and monitoring techniques," SPE 21048, XP-002683324, 1991, pp. 475-490, Society of Petroleum Engineers, Inc.
Office Action (Final) dated Nov. 8, 2012 (17 pages), U.S. Appl. No. 12/722,410, filed Mar. 11, 2010.
Office Action dated Apr. 8, 2013 (50 pages), U.S. Appl. No. 13/007,363, filed Jan. 14, 2011.
Office Action dated Apr. 9, 2013 (48 pages), U.S. Appl. No. 13/007,369, filed Jan. 14, 2011.
Foreign communication from a related counterpart application—International Preliminary Report on Patentability, PCT/GB2011/000630, Dec. 14, 2012, 6 pages.
Office Action dated Feb. 11, 2013 (16 pages), U.S. Appl. No. 12/683,337, filed Jan. 6, 2010.
Office Action dated Feb. 12, 2013 (11 pages), U.S. Appl. No. 12/683,343, filed Jan. 6, 2010.

\* cited by examiner

METHOD AND SYSTEM FOR SERVICING A WELLBORE

CROSS-REFERENCE TO RELATED APPLICATIONS

Not applicable.

STATEMENT REGARDING FEDERALLY SPONSORED RESEARCH OR DEVELOPMENT

Not applicable.

REFERENCE TO A MICROFICHE APPENDIX

Not applicable.

FIELD OF THE INVENTION

The present invention generally relates to the treatment of water used to produce wellbore servicing fluids.

BACKGROUND OF THE INVENTION

Servicing operations are performed with respect to a wellbore penetrating a subterranean formation for a variety of purposes. Often, a suitable fluid supply is required to prepare such wellbore servicing fluids employed in the performance of various wellbore servicing operations. However, a fluid supply proximate to a wellbore may be abundant, but nonetheless unusable due to the presence of bacteria or other non-beneficial microorganisms, undesirable organic compositions, or combinations thereof, within the fluid supply. For example, water extracted from a wellbore (e.g., produced water), surface water, and/or flowback water, may be unsuitable for use in wellbore servicing operations and/or for the preparation of wellbore servicing fluids due to the presence of undesirable microorganisms and/or organic compositions. Accordingly, there is a need for transforming such abundantly available but unusable fluids into fluids that are usable for preparing wellbore servicing fluids that may be employed in wellbore servicing operations.

SUMMARY OF THE INVENTION

Disclosed herein is a method of servicing a wellbore, comprising transporting a fluid treatment system to a wellsite, accessing a water source proximate to the wellsite, introducing a water stream from the water source into the fluid treatment system, irradiating at least a portion of the water stream within the fluid treatment system, wherein the portion of the water stream is irradiated by exposing the portion of the water stream to ultraviolet light emitted from at least one pulsed ultraviolet lamp, forming a wellbore servicing fluid from the irradiated water stream, and placing the wellbore servicing fluid into the wellbore.

Also disclosed herein is a method of servicing a wellbore, comprising accessing a water source to form a water stream, irradiating at least a portion of the water stream to yield an irradiated water stream, wherein the portion of the water stream is irradiated by exposing the portion of the water stream to ultraviolet light emitted from a pulsed ultraviolet lamp, forming a wellbore servicing fluid from the irradiated water stream, and placing the wellbore servicing fluid into the wellbore.

Further disclosed herein is a fluid treatment system for servicing a wellbore, comprising an ultraviolet irradiation unit, the ultraviolet irradiation unit comprising at least one ultraviolet irradiation chamber, the at least one ultraviolet irradiation chamber comprising at least one pulsed ultraviolet lamp, at least one component of wellbore servicing equipment, the ultraviolet irradiation unit being in fluid communication with the at least one component of wellbore servicing equipment, and a wellhead providing access to the wellbore, the at least one component of wellbore servicing equipment being in fluid communication with the wellhead.

BRIEF DESCRIPTION OF THE DRAWINGS

For a more complete understanding of the present disclosure, reference is now made to the following brief description, taken in connection with the accompanying drawings and detailed description, wherein like reference numerals represent like parts.

DETAILED DESCRIPTION OF THE EMBODIMENTS

Figure 1:
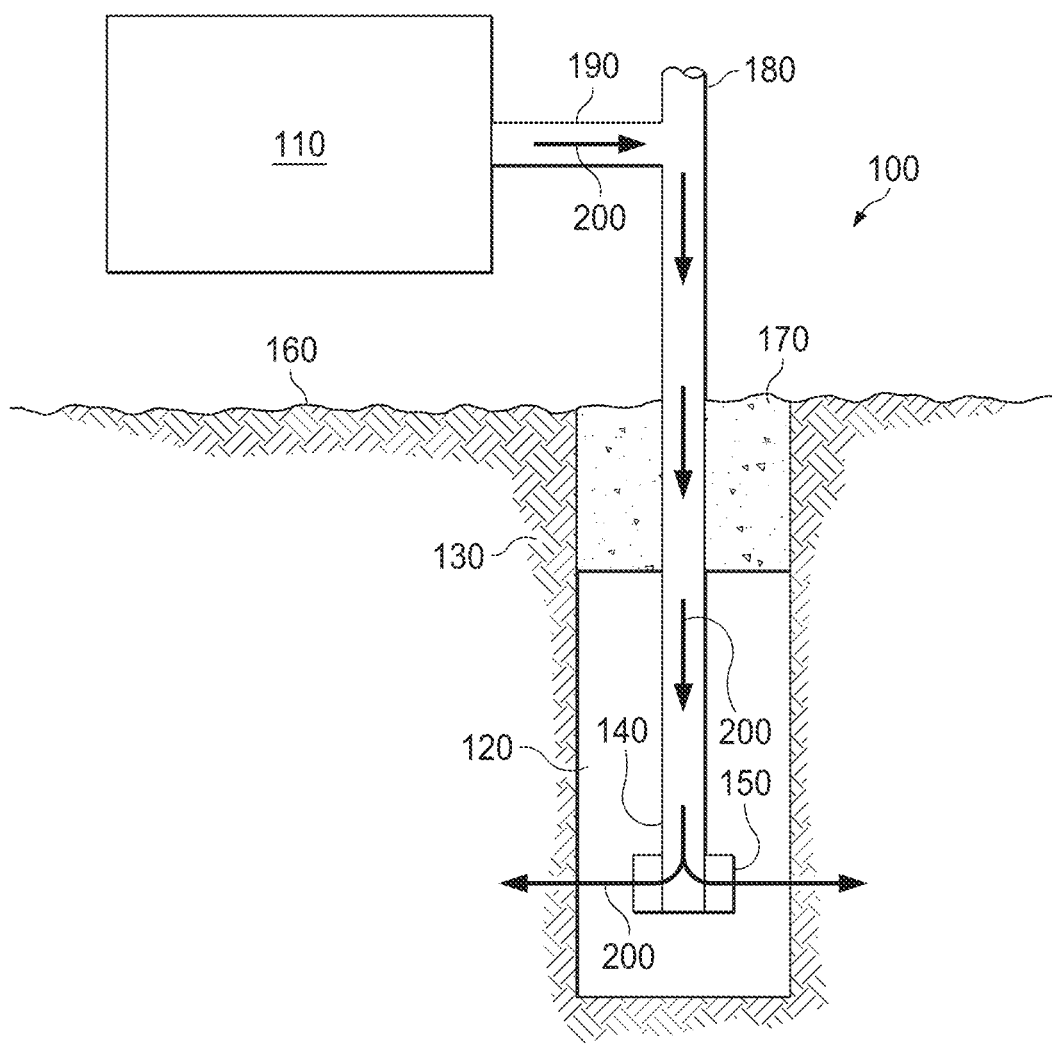
FIG. 1 is a simplified schematic view of a wellbore and wellbore servicing system according to an embodiment of the disclosure.

It should be understood at the outset that although illustrative implementations of one or more embodiments are illustrated below, the disclosed assemblies and methods may be implemented using any number of techniques, whether currently known or in existence. The disclosure should in no way be limited to the illustrative implementations, drawings, and techniques illustrated below, but may be modified within the scope of the appended claims along with their full scope of equivalents.

In the following discussion and in the claims, the terms "including" and "comprising" are used in an open-ended fashion, and thus should be interpreted to mean "including, but not limited to . . . ." Reference to up or down will be made for purposes of description with "up," "upper," "upward," or "upstream" meaning toward the surface of the wellbore and with "down," "lower," "downward," or "downstream" meaning toward the terminal end of the well, regardless of the wellbore orientation. The various characteristics mentioned above, as well as other features and characteristics described in more detail below, will be readily apparent to those skilled in the art with the aid of this disclosure upon reading the following detailed description of the embodiments, and by referring to the accompanying drawings.

Relatively large amounts of water may be needed for the preparation of wellbore servicing fluids such as fracturing fluids. Common water sources used for preparing wellbore servicing fluids include water co-produced in the production of oil and gas from a subterranean formation (hereinafter referred to as produced water), surface water, municipal water, or combinations thereof. Water obtained from any one or more of such sources may contain various contaminants such as dissolved and/or entrained organics, particulate material, microorganisms, or combinations thereof. For example, produced water may contain dissolved and entrained organic materials such as oil and gas residing in a subterranean formation or flowback from wellbore servicing fluids pumped into a wellbore. As such, produced water may contain paraffins, aromatics, resins, asphaltenes, or combinations thereof, as dissolved components or as a separate phase. In addition, produced water may contain suspended particulates. Similarly, for example, surface water, may contain suspended particulates and/or a separate organic phase. Furthermore, any one or more of the above-mentioned water sources may include bacteria and other microorganisms. A fluid that contains contaminants (for example, oxidizable organic contaminants), such as those discussed above, may adversely affect the intended function of the fluid and/or render the fluid unusable in wellbore servicing operations and/or for use in producing a wellbore servicing fluid. In addition, as discussed in U.S. Pat. No. 7,332,094, which is hereby incorporated by reference in its entirety, polymer(s) present in gelling agents, for example, as may be utilized in fracturing applications, may serve as a food source for any bacteria present in a fracturing fluid or the base water of the fluid. In addition, bacteria and other microorganisms may lead to undesirable hydrogen sulfide formation, increase corrosion of downhole equipment, form biofilms that may cause fouling and/or generally affect conductivity of a fractured formation. Therefore, the presence of bacteria in water used to prepare a fracturing fluid may negatively impact the results obtained from a fracturing operation.

FIG. 1 schematically illustrates an embodiment of a wellbore servicing system 110. In the embodiment of FIG. 1, the wellbore servicing system 110 is deployed at a wellsite 100 and is fluidly coupled to a wellbore 120. The wellbore 120 penetrates a subterranean formation 130 for the purpose of recovering hydrocarbons, storing hydrocarbons, disposing of carbon dioxide, or the like. The wellbore 120 may be drilled into the subterranean formation 130 using any suitable drilling technique. In an embodiment, a drilling or servicing rig may comprise a derrick with a rig floor through which a pipe string 140 (e.g., a drill string, segmented tubing, coiled tubing, etc.) may be lowered into the wellbore 120. A wellbore servicing apparatus 150 configured for one or more wellbore servicing operations may be integrated within the pipe string 140. Additional downhole tools may be included with and/or integrated within the wellbore servicing apparatus 150 and/or the pipe string 140, for example, one or more isolation devices (for example, a packer, such as a swellable or mechanical packer).

The drilling or servicing rig may be conventional and may comprise a motor driven winch and other associated equipment for lowering the pipe string 140 and/or wellbore servicing apparatus 150 into the wellbore 120. Alternatively, a mobile workover rig, a wellbore servicing unit (e.g., coiled tubing units), or the like may be used to lower the pipe string 140 and/or wellbore servicing apparatus 150 into the wellbore 120.

The wellbore 120 may extend substantially vertically away from the earth's surface 160 over a vertical wellbore portion, or may deviate at any angle from the earth's surface 160 over a deviated or horizontal wellbore portion. Alternatively, portions or substantially all of the wellbore 120 may be vertical, deviated, horizontal, and/or curved. In some instances, a portion of the pipe string 140 may be secured into position within the wellbore 120 in a conventional manner using cement 170 (e.g., such as a casing or liner); alternatively, the pipe string 140 may be partially cemented in wellbore 120; alternatively, the pipe string 140 may be uncemented in the wellbore 120. In an embodiment, the pipe string 140 may comprise two or more concentrically positioned strings of pipe (e.g., a first pipe string such as jointed pipe or coiled tubing may be positioned within a second pipe string such as casing cemented within the wellbore). It is noted that although one or more of the figures may exemplify a given operating environment, the principles of the devices, systems, and methods disclosed may be similarly applicable in other operational environments, such as offshore and/or subsea wellbore applications.

In an embodiment, the wellbore servicing system 110 may be coupled to a wellhead 180 via a conduit 190, and the wellhead 180 may be connected to the pipe string 140. In various embodiments, the pipe string 140 may comprise a casing string, a liner, a production tubing, coiled tubing, a work string, a drilling string, the like, or combinations thereof. The pipe string 140 may extend from the earth's surface 160 downward within the wellbore 120 to a predetermined or desirable depth, for example, such that the wellbore servicing apparatus 150 is positioned substantially proximate to a portion of the subterranean formation 130 to be serviced (e.g., into which a fracture is to be introduced). Arrows 200 indicate a route of fluid communication from the wellbore servicing system 110 to the wellhead 180 via conduit 190, from the wellhead 180 to the wellbore servicing apparatus 150 via pipe string 140, and from the wellbore servicing apparatus 150 into the subterranean formation 130. The wellbore servicing apparatus 150 may be configured to perform one or more servicing operations, for example, fracturing the formation 130, hydrajetting and/or perforating casing (when present) and/or the formation 130, expanding or extending a fluid path through or into the subterranean formation 130, producing hydrocarbons from the formation 130, or other servicing operation. In an embodiment, the wellbore servicing apparatus 150 may comprise one or more ports, apertures, nozzles, jets, windows, or combinations thereof for the communication of fluid from a flowbore of the pipe string 140 to the subterranean formation 130. In an embodiment, the wellbore servicing apparatus 150 comprises a housing comprising a plurality of housing ports, a sleeve being movable with respect to the housing, the sleeve comprising a plurality of sleeve ports, the plurality of housing ports being selectively alignable with the plurality of sleeve ports to provide a fluid flow path 200 from the wellbore servicing apparatus 150 to the wellbore 120, the subterranean formation 130, or combinations thereof. In an embodiment, the wellbore servicing apparatus 150 may be configurable for the performance of multiple servicing operations.

Figure 2:
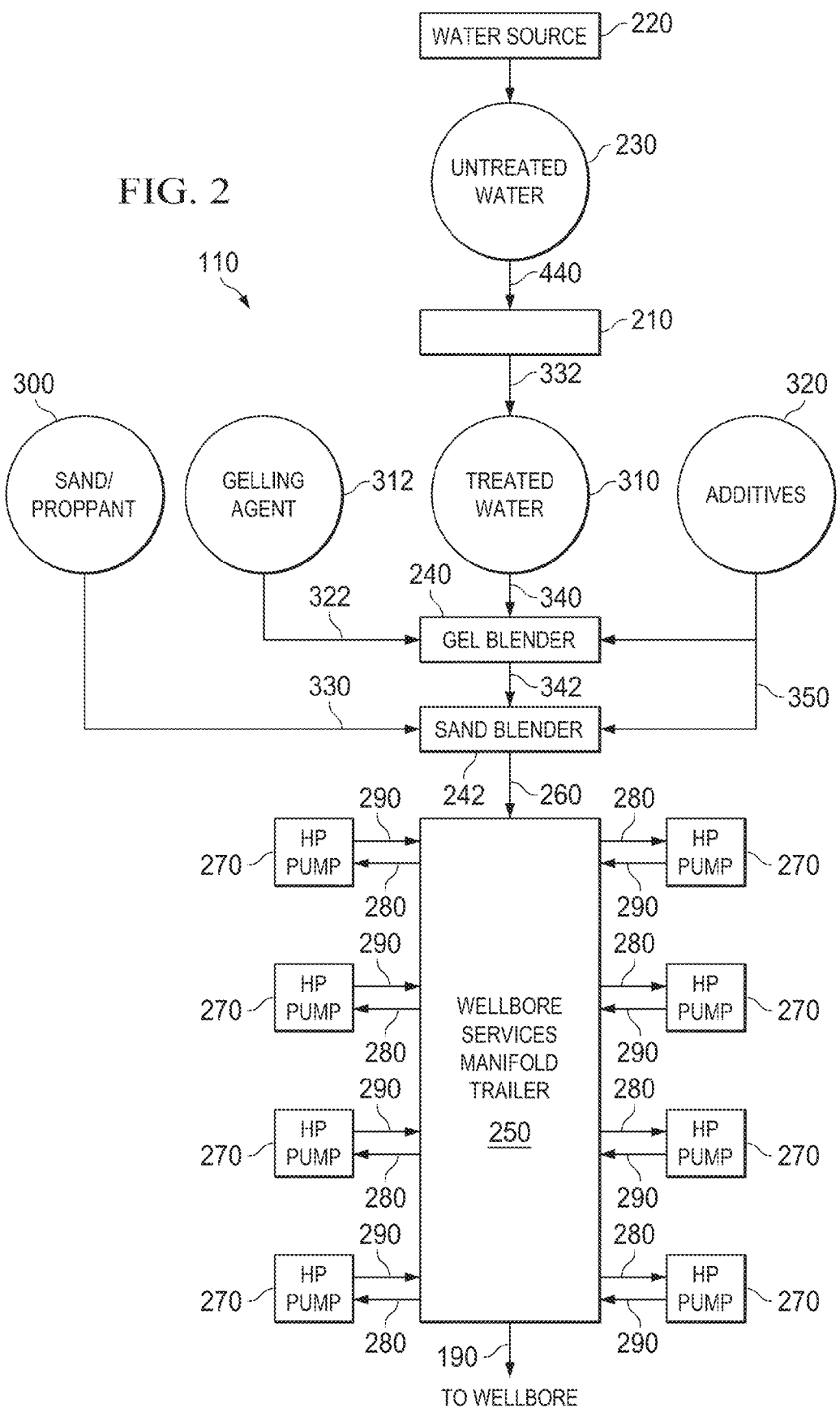
FIG. 2 is a simplified schematic view of a wellbore servicing system according to an embodiment of the disclosure.

FIG. 2 schematically illustrates an embodiment of the wellbore servicing system 110. In an embodiment, the wellbore servicing system generally comprises a fluid treatment system 210, a water source 220, one or more storage vessels (such as storage vessels 230, 300, 310, 312, and 320) and one or more wellbore servicing equipment components, for example, in the embodiment of FIG. 2, a gel blender 240, a sand blender 242, a wellbore services manifold trailer 250, and one or more high-pressure (HP) pumps 270. In the embodiment of FIG. 2, the fluid treatment system 210 obtains water, either directly or indirectly, from water source 220. Water from the fluid treatment system 210 is introduced, either directly or indirectly, into the gel blender 240 and then into the sand blender 242 where the water is mixed with various other components and/or additives to form the wellbore servicing fluid. The wellbore servicing fluid is introduced into the wellbore services manifold trailer 250, which is in fluid communication with the one or more HP pumps 270, and then introduced into the conduit 190. As will be described herein, the fluid communication between two or more components of the wellbore servicing system 110 and/or the fluid treatment system 210 may be provided any suitable flowline or conduit. Persons of ordinary skill in the art with the aid of this disclosure will appreciate that the flowlines described herein may include various configurations of piping, tubing, etc. that are fluidly connected, for example, via flanges, collars, welds, etc. These flowlines may include various configurations of pipe tees, elbows, and the like. These flowlines fluidly connect the various wellbore servicing fluid process equipment described herein.

In an embodiment, a wellbore servicing system, such as the wellbore servicing system 110, may be configured to communicate a suitable fluid into the wellbore at a rate and/or pressure suitable for the performance of a given wellbore servicing operation. For example, in an embodiment where the wellbore servicing system 110 is configured for the performance of a stimulation operation (e.g., a perforating and/or fracturing operation), a wellbore servicing system like wellbore servicing system 110 may be configured to deliver a stimulation fluid (e.g., a perforating and/or fracturing fluid) at a rate and/or pressure sufficient for initiating, forming, and/or extending a fracture into a hydrocarbon-bearing formation (such as subterranean formation 130 or a portion thereof). In such an operation (e.g., a perforating or fracturing operation), wellbore servicing fluids, such as particle (e.g., proppant) laden fluids, are pumped at a relatively high-pressure into the wellbore 120. The particle laden fluids may then be introduced into a portion of the subterranean formation 130 at a pressure and velocity sufficient to cut and/or abrade a casing and/or initiate, create, or extend perforation tunnels and/or fractures within the subterranean formation 130. Proppants (e.g., grains of sand, glass beads, shells, ceramic particles, etc.,) may be mixed with the wellbore servicing fluid to keep the fractures open so that hydrocarbons may be produced from the subterranean formation 130 and flow into the wellbore 120. Hydraulic fracturing may create high-conductivity fluid communication between the wellbore 120 and the subterranean formation 130. Although one or more of the embodiments disclosed herein may be disclosed with reference to a stimulation operation, such as a perforating or fracturing operation, upon viewing this disclosure one of skill in the art will appreciate that a wellbore servicing system like wellbore servicing system 110 and/or the methods disclosed herein may be employed in the performance of various other wellbore servicing operations. As such, unless otherwise noted, although one or more of the embodiments disclosed herein may be disclosed with reference to a stimulation operation, the instant disclosure should not be construed as so-limited.

In an embodiment, the water source 220 may comprise produced water, flowback water, surface water, a water well, potable water, municipal water, or combinations thereof. For example, in an embodiment the water obtained from the water source 220 may comprise produced water that has been extracted from the wellbore 120, for example, substantially commensurate with the production of hydrocarbons from the wellbore 120. As discussed above, produced water may comprise dissolved and/or entrained organic materials, salts, minerals, clays, paraffins, aromatics, resins, asphaltenes, and/or other natural or synthetic constituents that are displaced from a hydrocarbon formation during the production of the hydrocarbons or a wellbore servicing operation. In an additional or alternative embodiment, water obtained from the water source 220 may comprise flowback water, for example, water that has previously been introduced into the wellbore 120 during a wellbore servicing operation and subsequently flowed back or returned to the surface. In addition, the flowback water may comprise hydrocarbons, gelling agents, friction reducers, surfactants and/or remnants of wellbore servicing fluids previously introduced into the wellbore 120 during wellbore servicing operations.

In another additional or alternative embodiment, water obtained from the water source 220 may further comprise surface water, for example, water contained in natural and/or manmade water features (such as ditches, ponds, rivers, lakes, oceans, etc.). In still another additional or alternative embodiment, water obtained from the water source 220 may comprise water obtained from water wells or a municipal source. In one or more of such embodiments, water obtained from the water source 220 may be stored in local or remote containers. Water obtained from the water source 220 may comprise water that originated from near the wellbore 120 and/or may be water that has been transported to an area near the wellbore 120 from any suitable distance. In some embodiments, water obtained from the water source 220 may comprise any suitable combination of produced water, flowback water, local surface water, and/or container stored water.

In an embodiment, the water from water source 220 may be temporarily stored in an untreated water storage vessel 230 prior to being pumped to fluid treatment system 210; alternatively, the water may be introduced directly from the source into the fluid treatment system 210. In an embodiment, the fluid treatment system 210, as will be discussed herein below with reference to FIG. 3, may be configured to treat water obtained from a water source 220 in order to render the water suitable for preparing a wellbore servicing fluid and/or for utilization in a wellbore servicing operation. In an embodiment, after treatment via the fluid treatment system 210, the water may introduced, for example, via a conduit 332 into an intermediate storage vessel 310 for treated water; alternatively, the water may be routed to one or more other components of the wellbore servicing system 110.

In the embodiment of FIG. 2, the water may be introduced into the blender 240 from the intermediate storage vessel 310 via flowline 340; alternatively, the water may be introduced into the blender 240 directly from the fluid treatment system 210. In an embodiment, the blender 240 may be configured to mix solid and fluid components to form a well-blended wellbore servicing fluid. In the embodiment of FIG. 2, gelling agent from a storage vessel 312, treated water from intermediate storage vessel 310, and additives from a storage vessel 320 may be fed into the blender 240 via feedlines 322, 340 and 350, respectively. Alternatively, water treated by fluid treatment system may be fed directly into gel blender 240. In an embodiment, the gel blender 240 may comprise any suitable type and/or configuration of blender. For example, the gel blender 240 may be an Advanced Dry Polymer (ADP) blender and the additives may be dry blended and dry fed into the gel blender 240. In an alternative embodiment, additives may be pre-blended with water, for example, using a GEL PRO blender, which is a commercially available from Halliburton Energy Services, Inc., to form a liquid gel concentrate that may be fed into the gel blender 240. The mixing conditions of the gel blender 240, including time period, agitation method, pressure, and temperature of the gel blender 240, may be chosen by one of ordinary skill in the art with the aid of this disclosure to produce a homogeneous blend having a desirable composition, density, and/or viscosity. In the embodiment of FIG. 2, fluid from gel blender 240 and sand/proppant from a storage vessel 300 may be fed into sand blender 242 via feedlines 342 and 330, respectively. In alternative embodiments, sand or proppant, water, and/or additives may be premixed and/or stored in a storage tank before introduction into the wellbore services manifold trailer 250. In the embodiment of FIG. 2, the sand blender 242 is in fluid communication with a wellbore services manifold trailer 250 via a flowline 260.

In the embodiment of FIG. 2, the wellbore servicing fluid may be introduced into the wellbore services manifold trailer 250 from the sand blender 242 via flowline 260. As used herein, the term "wellbore services manifold trailer" may include a truck and/or trailer comprising one or more manifolds for receiving, organizing, pressurizing, and/or distributing wellbore servicing fluids during wellbore servicing operations. Alternatively, a wellbore servicing manifold need not be contained on a trailer, but may comprise any suitable configuration. In the embodiment illustrated by FIG. 2, the wellbore services manifold trailer 250 is coupled to eight high pressure (HP) pumps 270 via outlet flowlines 280 and inlet flowlines 290. In alternative embodiments, however, any suitable number, configuration, and/or type of pumps may be employed in a wellbore servicing operation. The HP pumps 270 may comprise any suitable type of high-pressure pump, a nonlimiting example of which is a positive displacement pump. Outlet flowlines 280 are outlet lines from the wellbore services manifold trailer 250 that supply fluid to the HP pumps 270. Inlet flowlines 290 are inlet lines from the HP pumps 270 that supply fluid to the wellbore services manifold trailer 250. In an embodiment, the HP pumps 270 may be configured to pressurize the wellbore servicing fluid to a pressure suitable for delivery into the wellhead 180. For example, the HP pumps 270 may be configured to increase the pressure of the wellbore servicing fluid to a pressure of about 10,000 p.s.i., alternatively, about 15,000 p.s.i., alternatively, about 20,000 p.s.i. or higher.

In an embodiment, the wellbore servicing fluid may be reintroduced into the wellbore services manifold trailer 250 from the HP pumps 270 via inlet flowlines 290, for example, such that the wellbore servicing fluid may have a suitable total fluid flow rate. One of skill in the art viewing this disclosure will appreciate that one or more of the wellbore servicing equipment components, for example, as disclosed herein, may be sized and/or provided in a number so as to achieve a suitable pressure and/or flow rate of the wellbore servicing fluid to the wellhead 180. For example, the wellbore servicing fluid may be provided from the wellbore services manifold trailer 250 via flowline 190 to the wellhead 180 at a total flow rate of between about 1 BPM to about 200 BPM, alternatively from between about 50 BPM to about 150 BPM, alternatively about 100 BPM.

Figure 3:
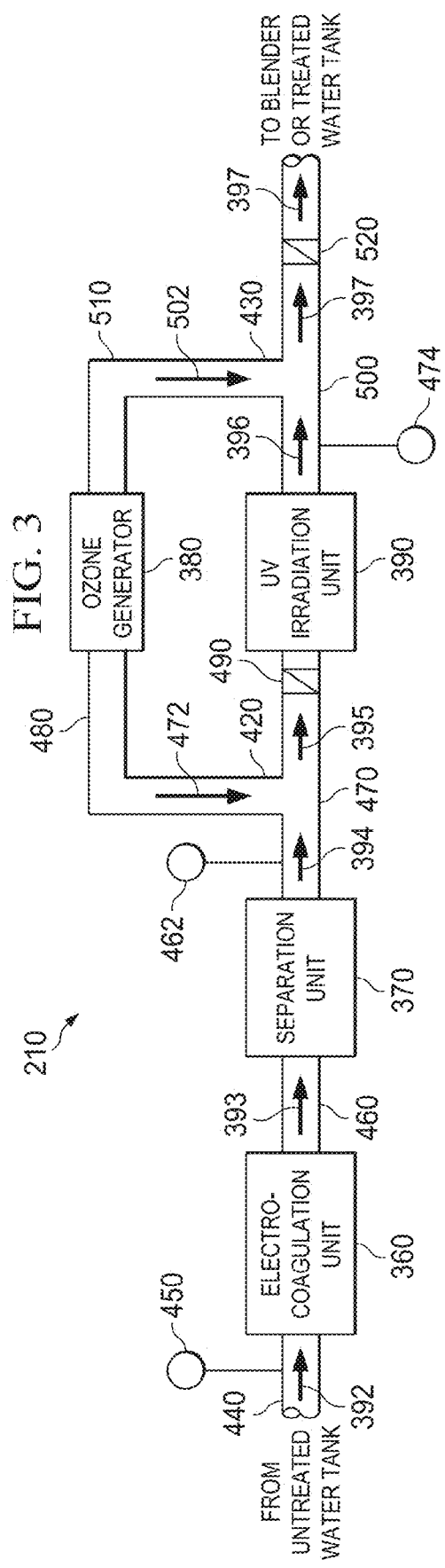
FIG. 3 is a simplified schematic view of a fluid treatment system according to an embodiment of the disclosure.

FIG. 3 illustrates an embodiment of the fluid treatment system 210. In an embodiment, the fluid treatment system 210 may be configured to render water treated therein suitable for use in the preparation of a wellbore servicing fluid, for example, a stimulation fluid such as a perforating or fracturing fluid. In an embodiment, the fluid treatment system may generally comprise an ultraviolet irradiation unit 390 alone or in combination with an electrocoagulation unit, a separation unit, an ozone generator, or combinations thereof. For example, in the embodiment of FIG. 3, the fluid treatment system 210 comprises an electrocoagulation unit 360, a separation unit 370, an ozone generator 380, and an ultraviolet irradiation unit 390. Although the embodiment of FIG. 3 illustrates the fluid treatment system 210 comprising each of an electrocoagulation unit 360, a separation unit 370, an ozone generator 380, and an ultraviolet irradiation unit 390, a fluid treatment system may comprise only an ultraviolet irradiation unit like ultraviolet irradiation unit 390, as will be disclosed herein, or an ultraviolet irradiation unit like ultraviolet irradiation unit 390 and one or more of an electrocoagulation unit, a separation unit, an ozone generator, as will also be disclosed herein.

In an embodiment, the electrocoagulation unit 360, the separation unit 370, the ozone generator 380, the ultraviolet irradiation unit 390, or combinations thereof may be configured to be mobile. For example, the electrocoagulation unit 360, the separation unit 370, the ozone generator 380, the ultraviolet irradiation unit 390, or combinations thereof may be situated on a common structural support, alternatively multiple, separate structural supports. Examples of a suitable structural support or supports for these units may include a trailer, truck, skid, barge or combinations thereof.

As discussed above, water obtained from the water source 220 may comprise produced water, surface water, municipal water, or combinations thereof containing various contaminants such as dissolved and/or entrained organics and/or inorganics, particulate material, microorganisms, or combinations thereof. In an embodiment, the fluid treatment system 210 may be configured to remove at least a portion of any undissolved constituents from the water, to oxidize at least a portion of any dissolved organic and/or inorganic constituents remaining in the water, to destroy and/or inactivate at least a portion of any microorganisms in the water, or combinations thereof. In various embodiments, the fluid treatment system may be configured (for example, by including or not including, one of more of the fluid treatment system components disclosed herein), as will be appreciated by one of skill in the art upon viewing this disclosure. For example, a fluid treatment system may be configured to treat water from a particular source and/or to treat water known to comprise one or more of the contaminants as disclosed herein.

Not intending to be bound by theory, water that contains various contaminants, such as those noted above, may adversely affect the intended function of a wellbore servicing fluid formed from the water and/or render fluid formed from the water unusable in a wellbore servicing operation and/or for producing a wellbore servicing fluid. Thus, in an embodiment, the fluid treatment system may be designed to substantially eliminate or at least substantially reduce, inter alia, the amount of oxidizable contaminants, particulate material, and/or active microorganisms, in a feed stream such as water from water source 220.

In an embodiment where a fluid treatment system comprises an electrocoagulation unit, for example, in the embodiment of FIG. 3, a fluid stream, for example, an untreated water stream 392, may be introduced into the electrocoagulation unit 360 via a conduit 440. In an embodiment, a first nephelometer 450 may be situated upstream from the electrocoagulation unit 360. The electrocoagulation unit 360 may generally be configured to precipitate and/or coalesce at least a portion of any metallic ions, organic colloids, inorganic colloids, combinations thereof from a water stream such as untreated stream 392. In an embodiment, the electrocoagulation unit 360 may comprise a housing, in which one or more pairs of metallic plate electrodes are mounted in parallel. In an additional embodiment, the electrocoagulation unit may further comprise a direct current power source for applying a direct current voltage across the plate electrodes and a device for regulating a current density between the pairs of plate electrodes. The electrodes may be made of a suitable electrically conductive material. Nonlimiting examples of a suitable electrically conductive material include iron, aluminum, titanium, graphite, steel, and alloys or combinations thereof. In addition, the electrocoagulation unit 360 may further comprise a fluid inlet through which a fluid may be introduced into the housing and a fluid outlet through which treated fluid (e.g., an electrocoagulated fluid stream) may be expelled. In the housing, the untreated water stream may be flowed between and past the pairs of electrodes while the plate electrodes are subjected to a direct current voltage. Not intending to be bound by theory, application of a voltage to the electrodes may cause metal from a negative electrode of a given electrode pair to ionize and enter into the untreated water stream flowing through the housing. The newly formed metal ions may react with contaminants in the fluid, causing such contaminants or a portion thereof to be precipitated and/or coalesced from the fluid. The electrocoagulation unit 360 may be sized to treat a suitable volume of fluid (e.g., untreated water), for example, the electrocoagulation unit may be configured for the treatment of from about 100 gal/min to 2,000 gal/min, alternatively, from about 150 gal/min to about 1,000 gal/min. In an embodiment, the fluid treatment system 210 may comprise more than one electrocoagulation unit may be operated in parallel, for example, thereby enabling the treatment of an increased volume of fluid and/or at an increased rate of treatment.

In an embodiment, the turbidity of a stream (e.g., a water stream) may affect the efficacy of one or more components of the fluid treatment system 210, for example, the ultraviolet irradiation unit 390 (as will be discussed herein below in greater detail). A method of measure of water turbidity may be found in EPA publication, *Methods for Chemical Analysis of Water and Wastes*, as Method 180.1, "Determination of Turbidity by Nephelometry." In an embodiment, an untreated water stream such as untreated water stream 392 may be characterized as having a first turbidity (e.g., as measured by the first nephelometer 450), measured in nephelometric turbidity units (NTU), of greater than 40 NTU, alternatively greater than 45 NTU, and alternatively greater than 50 NTU prior to treatment in the electrocoagulation unit 360. As the untreated water stream 392 passes through the electrocoagulation unit 360, a direct electrical current may be passed through the water. Not seeking to be bound by theory, in an embodiment, passing the direct electrical current through the water may coalesce a portion of any undissolved solids and undissolved organics in the untreated water stream. In an embodiment, treatment of the untreated water stream 392 may yield a water stream 393 comprising coalesced undissolved solids, coalesced undissolved organics and/or inorganics, and dissolved organics and/or inorganics.

In an embodiment where the fluid treatment system comprises a separation unit, for example, in the embodiment of FIG. 3, a fluid stream, for example, the water stream 393 comprising coalesced undissolved solids, coalesced undissolved organics and/or inorganics, and dissolved organics and/or inorganics, may be introduced into the separation unit 370 via conduit 460. In an embodiment, the separation unit 370 may be configured to remove at least a portion of undissolved solids and undissolved organics and/or inorganics coalesced by the electrocoagulation unit 360 from a water stream such as water stream 393. In an embodiment, the separation unit 370 may comprise one or more suitable filters, nonlimiting examples of which include a column filter, a membrane filter, a ceramic filter, a sand filter, or combinations thereof. In an embodiment, the one or more filters may have a pore size ranging from about 0.01 microns to about 50 microns. The pore size of the filter(s) may be chosen based on the type and amounts of the contaminants in the water stream 392, as well as parameters of the electrocoagulation unit 360. In an embodiment, the separation unit 370 may be operated at a pressure ranging from about 20 p.s.i. to about 150 p.s.i., alternatively, from about 20 p.s.i. to about 80 p.s.i. to facilitate the movement of water stream 393 through the filters. Alternatively, the separation unit 370 may comprise any separation device as will be recognized by one skilled in the art upon viewing this disclosure as suitable for separating undissolved and/or suspended solids from a liquid. For example, the separation unit 370 may comprise a centrifuge separator or a hydrocyclone separator. In an embodiment, a second nephelometer 462 may be situated downstream from the separation unit 370 and upstream from an ozone inlet 420 (as will be discussed herein below) to measure the turbidity of the water exiting the separation unit.

In an embodiment, treatment of a water stream (e.g., water stream 393) via the separation unit 370 may remove at least a portion of undissolved solids and undissolved organics, for example, as may result from coalescence by the electrocoagulation unit 360, from the water stream 393 to yield a substantially single phase water stream 394. For example, the separation unit 370 may remove from approximately 50% to approximately 100% of the undissolved solids from the water stream 393, and/or from approximately 50% to approximately 100% of the undissolved organics and/or inorganics from the water stream 393. In an embodiment, the substantially single phase water stream 394 exiting the separation unit may comprise dissolved organics and/or inorganics, as well as bacteria and other microorganisms that pass through the filters of the separation unit 370.

In an embodiment, the substantially single-phase water stream 394 may be characterized as having a second turbidity of less than 50 NTU, alternatively less than 45 NTU, alternatively less than 40 NTU, following treatment in the separation unit 370. In an embodiment, a controller may be in signal communication with one or more of nephelometers 450 and/or 462. In such an embodiment, the controller may be configured to monitor the first turbidity, the second turbidity, or both and to adjust the voltage applied to the electrocoagulation unit 360 as a function of the first turbidity, the second turbidity, the difference between the first second turbidity, or combinations thereof. For example, not intending to be bound by theory, if the first turbidity upstream from the electrocoagulation unit 360 is greater than 50 NTU by a certain threshold value, then the current may be increased so as to more effectively coagulate the undissolved solids and organics in the water stream. In addition, if the second turbidity measured downstream from the separation unit 370 is greater than or equal to 50 NTU or less than 50 NTU by an amount deemed insufficient for processes downstream from the separation unit 370, then the current may be increased. However, if the high second turbidity reading is deemed by a controller (e.g., the same or a different controller) as being caused by a clogged or damaged separation element (e.g., a clogged or damaged filter) in the separation unit 370, then the second controller may cause the water stream passing through conduit 460 and into the separation unit 370 to be redirected through a redundant separation element in the separation unit 370, so that the clogged or damaged separation element can be replaced while the fluid treatment system 210 continues to operate. Similarly, if the first or second or both turbidity readings meet a desired set point or threshold value (e.g., a turbidity reading of less than 50 NTU), then the controller may decrease the voltage in the electrocoagulation unit 360, so as to attain a desired second turbidity reading with decreased power consumption of the electrocoagulation unit 360. In an embodiment, the efficiency of ozone treatment of a fluid and/or ultraviolet irradiation of a fluid may be improved by prior electrocoagulation and/or separation of undissolved components of a fluid stream, for example, in electrocoagulation unit 360 and/or separation unit 370. Not seeking to be bound by theory, undissolved particulate matter in a fluid stream may cause light scattering, thereby decreasing the efficiency of an ozone treatment and/or ultraviolet irradiation treatment of a fluid. Not intending to be bound by theory, electrocoagulation may remove at least a portion of such undissolved particulate matter, thereby improving the efficiency of a subsequent ozone treatment and/or a subsequent ultraviolet irradiation treatment.

In an embodiment where a fluid stream is subjected to ozonation as will be disclosed herein, for example, in the embodiment of FIG. 3, such a fluid stream, for example, the substantially single-phase water stream 394 may be routed toward a first ozone inlet 420 via conduit 470. In such an embodiment, ozone may be introduced via conduit 480 into the substantially single-phase water stream 394. The first ozone inlet 420 may allow for the water stream 394 to be combined with a first ozone stream 472 produced by ozone generator 380.

In an embodiment, the ozone generator 380 may comprise one or more units. In an embodiment, the ozone generator 380 may be characterized as having an ozone production capacity in the range of from about 500 g/h to about 10,000 g/h. In an embodiment, ozone may be present in the gaseous stream introduced into the fluid in a range of from about 0.5% by weight to about 10% by weight. An example of a suitable commercial ozone generator, for example, having ozone production capacities within a suitable range is available from Pinnacle Ozone Solutions in Cocoa, Fla.

In an embodiment, the ozone stream 472 may be introduced into the fluid stream, for example, into the substantially single-phase water stream 394, at ozone inlet 420 via any suitable method or device, for example, the ozone stream 472 may be sparged, bubbled, or otherwise intermingled into the water stream 394, for example, to promote dissolution of ozone into the water stream 394. In an embodiment, ozone from the ozone stream 472 may be mixed with the water stream 394 at a ratio of from about 1 mg $O_3$/L $H_2O$ to about 100 mg $O_3$/L $H_2O$, alternatively from about 2 mg $O_3$/L $H_2O$ to about 50 mg $O_3$/L $H_2O$, alternatively from about 5 mg $O_3$/L $H_2O$ to about 20 mg $O_3$/L $H_2O$. In an embodiment, introduction of the ozone stream 472 into water stream 394 may yield an ozonated water stream 395. Not intending to be bound by theory, the presence of ozone in the ozonated water stream 395 may oxidize at least a portion of dissolved organics and/or inorganics and microorganisms present in the ozonated water stream 395.

In an embodiment, the pH of one or more streams, for example, one or more of the fluid streams as disclosed herein, may be monitored. For example, in an embodiment the pH of the substantially single-phase water stream 394 may be monitored prior to introduction of ozone (e.g., upstream from the ozone inlet 420) and the pH of ozonated water stream 395 may be monitored after the introduction of ozone (e.g., downstream from the ozone inlet 420). In addition, the pH of the substantially single-phase water stream 394 may be compared with the pH of ozonated water stream 395. In such an embodiment, the pH of such a fluid stream may be adjusted and/or altered (e.g., via the introduction of various basic and/or acidic compositions, as may be appreciated by one of skill in the art with the aid of this disclosure) to attain a desired, resultant pH and/or to maintain the pH of the stream within a desired number of pH units of the original pH. For example, in an embodiment, the pH may be adjusted if the change in pH of the stream before the introduction of ozone as compared to the pH of the stream after the introduction of ozone is at least about 0.5 pH units, alternatively, at least about 1.0 pH unit, alternatively, at least about 1.5 pH units.

In the embodiment of FIG. 3, the substantially single-phase water stream 394 may be characterized as having a second turbidity of less than about 50 NTU, alternatively less than about 45 NTU, alternatively less than about 40 NTU following treatment in the separation unit 370. In addition, a controller may be in signal communication with one or more of nephelometers 450 and 462, for example, so as to monitor the first turbidity, the second turbidity, the change in turbidity, or combinations thereof. In such an embodiment, the flow rate of the water stream may be adjusted and/or altered as a function of the first turbidity, the second turbidity, the change in turbidity, or combinations thereof. For example, if the second turbidity upstream from the irradiation unit 390 is greater than about 50 NTU, alternatively, greater than about 45 NTU, alternatively, greater than about 40 NTU, by a certain threshold value, then the flow rate may be decreased so as to allow a greater exposure time of the water stream to the ultraviolet light. Conversely, if the second turbidity upstream from the irradiation unit 390 is less than about 50 NTU, alternatively, less than about 45 NTU, alternatively, about 40 NTU, by a certain threshold value, then the flow rate may be increased so as to lessen the exposure time of the water stream to the ultraviolet light (for example, so as to allow for increased efficiency and/or decreased power consumption).

In an embodiment, a fluid stream is introduced into the ultraviolet irradiation unit 390. For example, in the embodiment of FIG. 3, the first ozonated water stream 395 may be introduced into the ultraviolet irradiation unit 390. In such an embodiment, the ozonated water stream 395 may be directed through a suitable fluid mixer 490 prior to introduction into the ultraviolet irradiation unit 390, for example, to further promote dissolution and/or dissipation of ozone in the first ozonated water stream 395 and reaction of the ozone with any residual contaminants present in the first ozonated water stream 395. The fluid mixer 490 may induce turbulent mixing of the ozonated water stream 395. Nonlimiting examples of a suitable fluid mixer include a so-called "plate mixer" and other suitable static in-line mixer configurations. In the embodiment of FIG. 3, the ozonated water stream 395 may be introduced into the ultraviolet irradiation unit 390 via a conduit 470.

In an embodiment the ultraviolet irradiation unit 390 may further comprise one or more nephelometers. For example, referring again to FIG. 3, the ultraviolet irradiation unit comprises a nephelometer 474 positioned downstream from one or more of the irradiation chambers 710. In an additional embodiment, the fluid treatment system 210 may further comprise a controller. In such an embodiment, the nephelometer 474 and/or one or more of nephelometers 450 and 462, disclosed herein with reference to FIG. 3, may be in signal communication with the controller and may monitor the turbidity and/or adjust the flow rate of the water stream as a function of the turbidity (as will be discussed herein below in greater detail). For example, and as will be disclosed herein, in an embodiment, treatment of a fluid stream (e.g., the ozonated water stream 395) may yield an irradiated fluid (e.g., water stream) that is substantially free of bacteria and active microorganisms (e.g., irradiated fluid stream 396). In the embodiment of FIG. 3, the nephelometer 474 monitors the fluid stream exiting the ultraviolet irradiation unit 390. In such an embodiment, the controller may be configured to control the flow rate of fluid via the ultraviolet irradiation unit 390 based upon the fluid exiting the ultraviolet irradiation unit. For example, in such an embodiment, the controller may be configured to adjust the flowrate so as to obtain a desired, resultant turbidity. As will be appreciated by one of skill in the art upon viewing this disclosure, a turbidity that is greater than such a desired range may be corrected by decreasing the flow rate via the ultraviolet irradiation unit, while a turbidity that is less than a desired range may be corrected by increasing the flow rate via the ultraviolet irradiation unit. A stream emitted from the ultraviolet irradiation unit 390 may be characterized as having a turbidity in the range of from about 0 NTU to about 50 NTU, alternatively, from about 1 NTU to about 10 NTU, alternatively from about 0.5 NTU to about 5 NTU, alternatively, less than about 0.5 NTU. In additional and/or alternative embodiments, an ultraviolet irradiation unit like ultraviolet irradiation unit 390 may comprise one or more nephelometers positioned to measure the turbidity of a fluid stream prior to introduction into the ultraviolet irradiation unit, during treatment within the ultraviolet irradiation unit (e.g., between successive irradiation chambers 710), or combinations thereof. For example, in an embodiment where such a nephelometer is positioned upstream from the ultraviolet irradiation unit, the controller may be configured to control the flow rate of the fluid stream being introduced into the fluid treatment unit based upon the turbidity of that stream, the flow rate through one or more irradiation chambers of the fluid treatment unit (e.g., to independently control fluid movement through each irradiation chamber), to control the number of irradiation chambers in operation, to control the power applied to each irradiation chamber during operation, or combinations thereof. Again, as will be appreciated by one of skill in the art upon viewing this disclosure, a relatively greater turbidity may necessitate a relatively lesser flow rate via the ultraviolet irradiation unit, while a relatively lesser turbidity may be accommodated by a relatively greater flow rate via the ultraviolet irradiation unit.

In the embodiment of FIG. 3, where the fluid stream being treated is ozonated prior to treatment with ultraviolet light, not intending to be bound by theory, treatment with ozone and ultraviolet radiation may act synergistically to increase the oxidative effect of the ozone present in the ozonated water stream 395. For example, treatment with ozone and ultraviolet radiation from the ultraviolet irradiation unit 390 may increase the oxidative effect of the ozone by a factor of approximately 100, not intending to be bound by theory, by increasing the concentration of hydroxyl radicals in the water. In an embodiment, the ultraviolet radiation may kill, sterilize and/or inactivate at least a portion of any microorganisms present in the ozonated water stream 395. In an embodiment, treatment with ozone and ultraviolet radiation in the ultraviolet irradiation unit 390 may yield a water stream 396 substantially free of undissolved solids, easily-oxidizable organics and active microorganisms, alternatively, a substantially undissolved solids-free, substantially organics-free, substantially active microorganism-free water stream, alternatively, a water stream that is substantially non-reactive with respect to oxidizing species.

In an embodiment, a fluid stream emitted from ultraviolet irradiation unit may be subjected to ozonation. For examples, in the embodiment of FIG. 3, the water stream 396 substantially free of undissolved solids, easily-oxidizable organics and active microorganisms may be directed toward a second ozone inlet 430 via conduit 500 where ozone may be introduced via second ozone conduit 510. The second ozone inlet 430 may allow the water stream 396 to be combined with a second ozone stream 502, which may be produced by the ozone generator 380, alternatively, a second ozone generator like ozone generator 380. In various embodiments, ozonation of a stream (e.g., via the second ozone inlet 430) may be in addition to a prior ozonation of the stream (e.g., via the first ozone inlet 420) or as an alternative to a prior ozonation.

In an embodiment, introduction of the second ozone stream 502 into the water stream 396 substantially free of undissolved solids, easily-oxidizable organics and active microorganisms via any suitable method or device, for example, the second ozone stream 502 may be sparged, bubbled, or otherwise intermingled into water stream 396, for example, to promote dissolution and/or dissipation of ozone into the water stream 396. In an embodiment, ozone from the second ozone stream 502 may be mixed with the water stream 396 at a ratio of about 1 mg O3/L H2O to about 100 mg O3/L H2O, alternatively from about 2 mg O3/L H2O to about 50 mg O3/L H2O, alternatively from about 5 mg O3/L H2O to about 20 mg O3/L H2O. In an embodiment, introduction of the second ozone stream 502 into the water stream 396 substantially free of undissolved solids, easily-oxidizable organics and active microorganisms may yield a second ozonated water stream 397.

In such an embodiment, for example, in the embodiment of FIG. 3, the second ozonated water stream 397 may be directed through a suitable fluid mixer 520 to further promote dissolution of ozone in the water of water stream 397 and reaction of the ozone with residual contaminants in the water stream 397. Not intending to be bound by theory, the additional ozone provided to water stream 396 by second ozone stream 502 may serve to reduce the amount of residual organics and residual active microorganisms in water stream 397. In an embodiment, a filter and/or filtration system such as described previously may be used to remove residual undissolved microorganisms or other undissolved residual materials from discharge from the fluid treatment system 210. A treated water stream 397 is discharged from fluid treatment system 210.

One measure of an effectiveness of a fluid treatment system like fluid treatment system 210 may be a reduction in a chemical oxygen demand (COD) of a fluid treated by system 210. As used herein, COD refers to the amount of organic pollutants found in water. Not intending to be bound by theory, because nearly all organic compounds can be fully oxidized to carbon dioxide with a strong oxidizing agent under acidic conditions, the capacity of an aqueous solution to consume oxygen by oxidation of dissolved organic and inorganic components may be employed as a measure of water quality (e.g., as a measure of the presence of readily oxidizable components within the water).

In an embodiment, wellbore servicing fluids, such as fracturing fluids, may comprise a gelling agent, for example, to increase the viscosity of the fluid to facilitate proppant transport. When the proppant has been placed (e.g., within the wellbore), a breaker may be contacted with the fluid to reduce its viscosity, for example, by a reaction between the gelling agent with the breaker. Nonlimiting examples of such breakers include oxidizing agents such as sodium peroxydisulfate and sodium chlorite. Not intending to be bound by theory, the presence of readily-oxidizable components in water, for example, as may be measured by the COD, may adversely and significantly affect the performance of such oxidizing breakers. In addition, some biocides may be oxidizing agents. For example, sodium hypochlorite is a commonly used biocide that functions as an oxidizing agent. Not intending to be bound by theory, the presence of readily-oxidizable components may likewise significantly affect the effectiveness of such oxidizing biocides or render such oxidizing biocides completely ineffective.

In an embodiment, water resulting from treatment in a fluid treatment system (e.g., treated stream 397) such as fluid treatment system 210 may be characterized as having a COD reduced by at least 30%, alternatively, at least 40%, alternatively at least 50% as compared to an untreated but otherwise similar water stream (e.g., stream 392). In an embodiment, water resulting from treatment in a fluid treatment system (e.g., treated stream 397) such as fluid treatment system 210 may further be characterized as having an active microorganism count reduced by at least 85%, alternatively at least 90%, alternatively at least 95% as compared to an untreated but otherwise similar water stream (e.g., stream 392). In an embodiment, water having a reduced COD, for example, as may result from treatment in a fluid treatment system such as fluid treatment system 210, may improve the performance of oxidizing agents such as oxidizing breakers and/or oxidizing biocides. In an embodiment, the COD may be monitored to prevent overtreatment with ozone. For example, overtreatment with ozone may result in ozone and/or a by-product thereof (e.g., oxygen) which may adversely affect the subsequent wellbore servicing fluid (e.g., may change the effectiveness of the gel breakers).

In an embodiment, a first amount of biocide may be added to the second ozonated water stream 397 in order to reduce the count of active microorganisms in water stream 397 even further. In an embodiment, the amount of biocide added may be at least approximately 50% less, alternatively, at least approximately 70% less, or alternatively, at least approximately 90% less than the amount of biocide that would be required to achieve an equivalent reduction in the active microorganism count in an untreated but otherwise similar water stream (e.g., untreated water stream 392).

In an embodiment, a fluid stream emitted from the fluid treatment system, for example, the second ozonated water stream 397, which is emitted from the fluid treatment system 210, may be employed in preparing a wellbore servicing fluid, as described above with reference to FIG. 2. In various embodiments, the water stream may be mixed with one or more suitable proppants and/or additives. Nonlimiting examples of suitable proppants include resin coated or uncoated sand, sintered bauxite, ceramic materials, glass beads, shells, hulls, plastics, or combinations thereof. Nonlimiting examples of suitable additives include polymers, crosslinkers, friction reducers, defoamers, foaming surfactants, fluid loss agents, weighting materials, latex emulsions, dispersants, vitrified shale and other fillers such as silica flour, sand and slag, formation conditioning agents, hollow glass or ceramic beads, elastomers, carbon fibers, glass fibers, metal fibers, minerals fibers, of combinations thereof. One of skill in the art will appreciate that various proppants and/or additives may be added alone or in combination and in various amounts to achieve various wellbore servicing fluids (for example, a fracturing fluid, a hydrajetting or perforating fluid, a drilling fluid, a fluid loss fluid, a sealant composition, etc., or combinations thereof).

Figure 4:
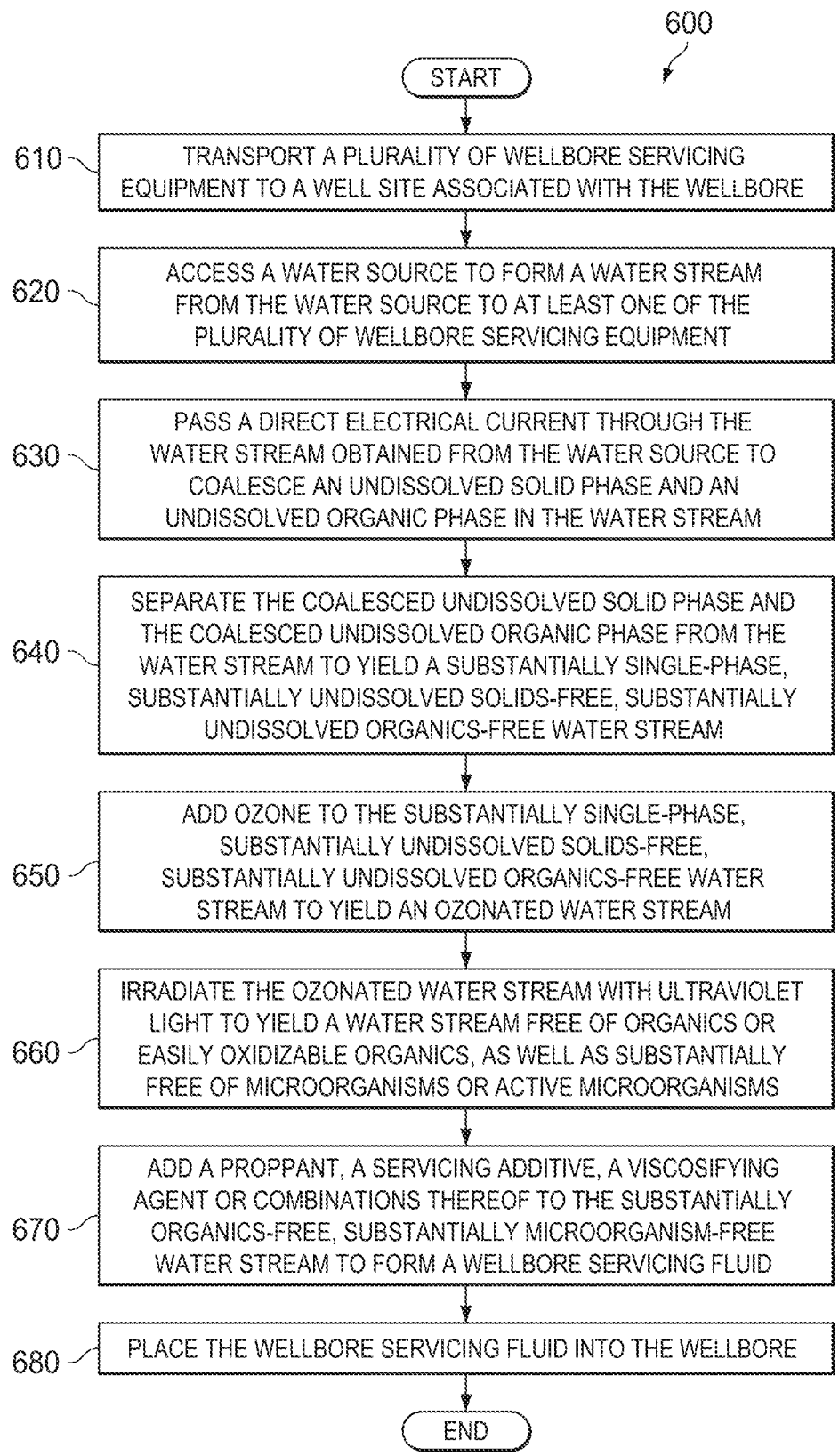
FIG. 4 is a flowchart of a method according to an embodiment of the disclosure.
Figure 5A:
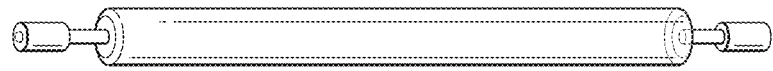
FIG. 5A is a simplified schematic view of a straight pulsed ultraviolet lamp according to an embodiment of the disclosure.
Figure 5B:
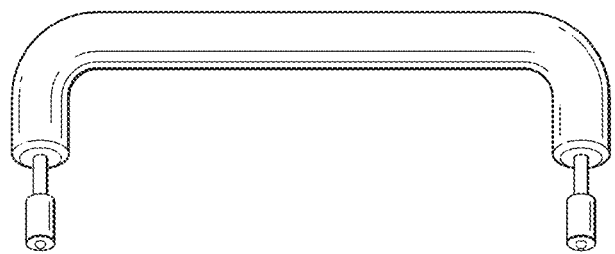
FIG. 5B is a simplified schematic view of a broad U-shaped pulsed ultraviolet lamp according to an embodiment of the disclosure.
Figure 5C:
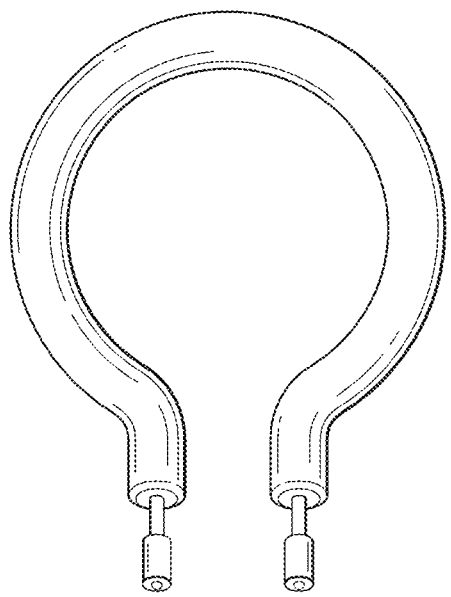
FIG. 5C is a simplified schematic view of a circular pulsed ultraviolet lamp according to an embodiment of the disclosure.
Figure 5D:
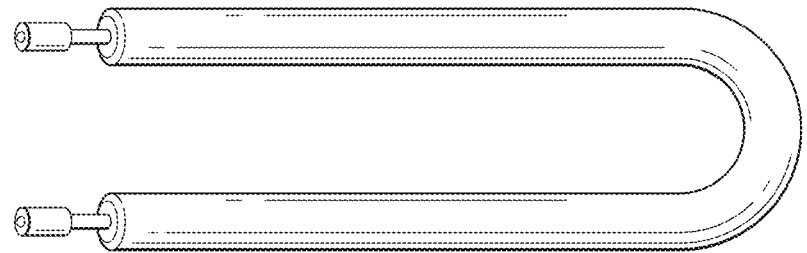
FIG. 5D is a simplified schematic view of a narrow U-shaped pulsed ultraviolet lamp according to an embodiment of the disclosure.
Figure 5E:
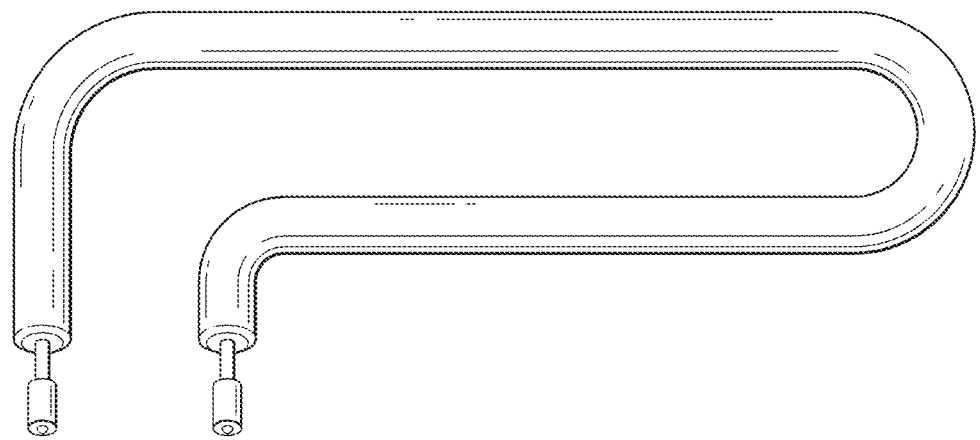
FIG. 5E is a simplified schematic view of a curved narrow U-shaped pulsed ultraviolet lamp according embodiment of the disclosure.

Referring to FIG. 4, a method 600 for servicing a wellbore is described. At block 610, a plurality of wellbore servicing equipment is transported to a well site 100 associated with the wellbore 120. At block 620, a water source 220 is accessed to form a water stream (e.g., stream 392) from the water source 220 to at least one of the plurality of wellbore servicing equipment. At block 630, a direct electrical current is passed through the water stream obtained from the water source 220 to coalesce an undissolved solid phase and an undissolved organic phase in the water stream. At block 640, the coalesced undissolved solid phase and the coalesced undissolved organic phase are separated from the water stream to yield a substantially single-phase, substantially undissolved solids-free, substantially undissolved organics-free water stream. At block 650, ozone is added to the substantially single-phase, substantially undissolved solids-free, substantially undissolved organics-free water stream to yield an ozonated water stream. At block 660, the ozonated water stream is irradiated with ultraviolet light to yield a substantially organics-free, substantially microorganism-free water stream, or at least a water stream substantially free of easily oxidizable organics and active microorganisms. At block 670, a proppant, a servicing additive, a viscosifying agent or combinations thereof may be added to the substantially organics-free, substantially microorganism-free water stream to form a well bore servicing fluid. At block 680, the wellbore servicing fluid is placed into the wellbore 120. In an alternative embodiment, one or more of the steps disclosed herein with respect to FIG. 4 may be omitted, for example, where the fluid treatment system employed is configured alternatively. In an embodiment, block 650 may be omitted and the untreated water source treated by electrocoagulation and pulsed ultraviolet irradiation. In an embodiment, block 630, block 640, and block 650 may be omitted and the untreated water source treated by pulsed ultraviolet irradiation.

In alternative embodiments, one or more components, embodiments, systems, or methods may be combined and/or substituted with like or equivalent components, embodiments, systems, or methods as disclosed in U.S. application Ser. No. 12/722,410 by Rory D. Daussin, et al., filed Mar. 11, 2010 and entitled "System and Method for Fluid Treatment" and U.S. application Ser. No. 12/774,393 by Wesley John Warren, filed May 5, 2010 and entitled "System and Method for Fluid Treatment," each of which is incorporated herein by reference in its entirety.

The ultraviolet irradiation unit 390, as will be discussed herein below with reference to FIG. 6, may generally be configured to expose a water stream or a portion thereof to ultraviolet radiation. In an embodiment, an ultraviolet irradiation unit, for example ultraviolet irradiation unit 390, as disclosed herein, may be utilized alone or in combination with an electrocoagulation unit, a separation unit, an ozone generator, or combinations thereof, for example, as also disclosed herein. For example, the ultraviolet irradiation unit 390 may be configured to render a water stream treated therein substantially free of bacteria and active microorganisms from untreated stream 392. For example, the ultraviolet irradiation unit 390 may be generally configured so as to expose a fluid stream moving via the ultraviolet irradiation unit to ultraviolet light.

Figure 6:
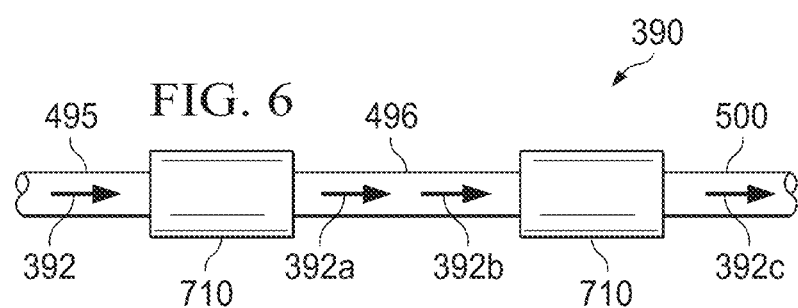
FIG. 6 is a simplified schematic view of an ultraviolet irradiation unit according to an embodiment of the disclosure.

Referring to FIG. 6, an embodiment of the ultraviolet irradiation unit 390 is illustrated. In the embodiment of FIG. 6, the ultraviolet irradiation unit 390 may generally comprise one or more ultraviolet irradiation chambers 710, positioned in series, and suitable conduits extending to, from, and/or between each of the irradiation chambers. In an embodiment, each of the one or more ultraviolet irradiation chambers 710 may comprise one or more pulsed ultraviolet lamps. Pulsed ultraviolet lamps may contain an inert gas such as xenon or krypton. In an embodiment, the one or more pulsed ultraviolet lamps may emit broad emission ultraviolet radiation at a wavelength of from about 180 nm to about 500 nm, alternatively about 200 nm to about 400 nm, alternatively, from about 220 nm to about 300 nm, alternatively about 260 nm. In an embodiment, each of the one or more ultraviolet lamps may be capable of emitting ultraviolet light at a dosage of at least about 1 $mJ/cm^2$, alternatively at least about 2 $mJ/cm^2$, alternatively at least about 3 $mJ/cm^2$.

Referring to FIGS. 5A through 5E, schematic views of lamp designs are illustrated. Pulsed ultraviolet lamps are typically constructed of sealed fused quartz tubes with an electrodes at each end and filled with a noble gas such as xenon or krypton. In embodiments as will be disclosed herein, a pulsed ultraviolet lamp may be configured in a shape that maximizes exposure time and/or light intensity with respect to a target substrate. In an embodiment, the pulsed ultraviolet lamps may be enclosed in a protective envelope (e.g., a fused quartz envelope) and sealed from the inflow of fluid. Examples of a suitable pulsed xenon lamp may be obtained from Xenon Corporation, Wilmington, Mass.

Referring to FIGS. 7A through 7C and 8A through 8C, partial views of embodiments of the ultraviolet irradiation chamber 710 are illustrated. In the embodiments of FIGS. 7A through 7C and 8A through 8C, the ultraviolet irradiation chamber 710 may comprise a conduit 800 generally defining a fluid flowpath and one or more pulsed xenon ultraviolet lamps 810 mounted so as to expose a fluid moving via the flowpath defined by the conduit 800 to ultraviolet irradiation. In the embodiments of FIGS. 7A through 7C and 8A through 8C, the conduit 800 is illustrated as a substantially circular pipe or tubular (e.g., having a substantially circular cross-section), alternatively, a conduit like conduit 800 may have any suitable cross-sectional shape.

In an embodiment, the one or more pulsed xenon ultraviolet lamps 810 may be configured, for example, in a customized design so as expose the fluid moving the flowpath of the conduit 800 to ultraviolet radiation at a given, desired intensity, for a given, desired duration, to provide a given, desired penetration by the ultraviolet irradiation into the fluid, or combinations thereof. As will be disclosed herein, such configurations may enhance the usefulness of the pulsed ultraviolet light emission in (1) a turbid flow stream; (2) in flow streams with a high flow rate; or (3) in turbid flow streams with a high flow rate. For example, the one or more pulsed xenon lamps 810 may be configured (e.g., with respect to the conduit 800) to optimize the ultraviolet light intensity and/or penetration thereof into the fluid moving via the flowpath, to optimize the exposure time of the fluid moving via the flowpath to the ultraviolet light, or combinations thereof. For example, in an embodiment as will be disclosed herein, the pulsed xenon ultraviolet lamp 810 emits high-peak ultraviolet pulses that may penetrate a fluid stream, providing relatively more efficient microorganism inactivation in a fluid stream having a relatively higher flow-rate, for example as compared to otherwise similar continuous mercury vapor ultraviolet lamps.

Figure 7A:
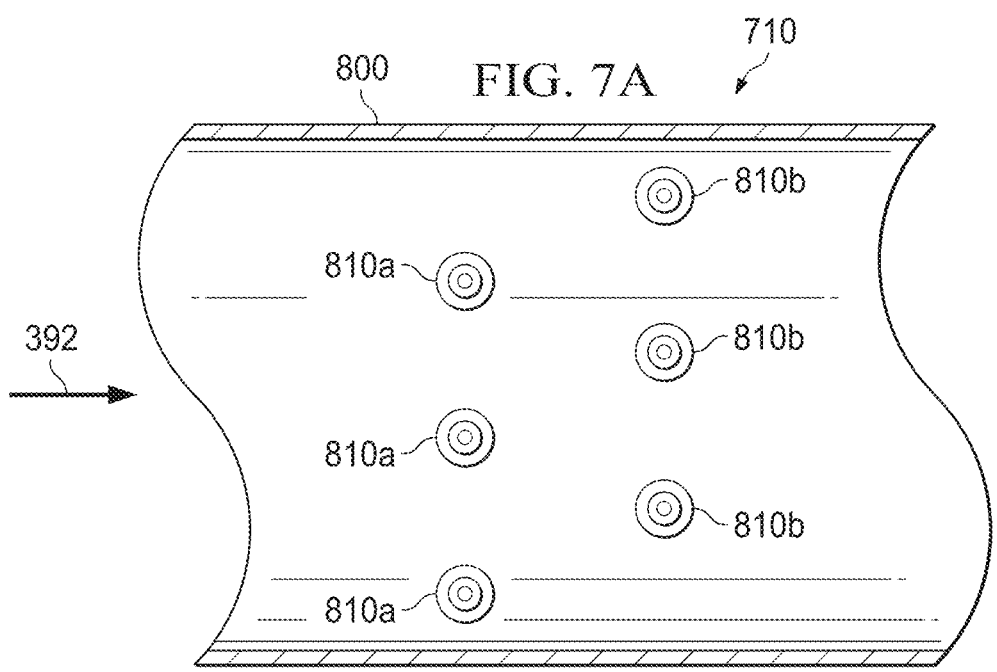
FIG. 7A is a simplified partial, cross-sectional side view parallel to the direction of fluid flow of an ultraviolet irradiation chamber according to an embodiment of the disclosure.
Figure 7B:
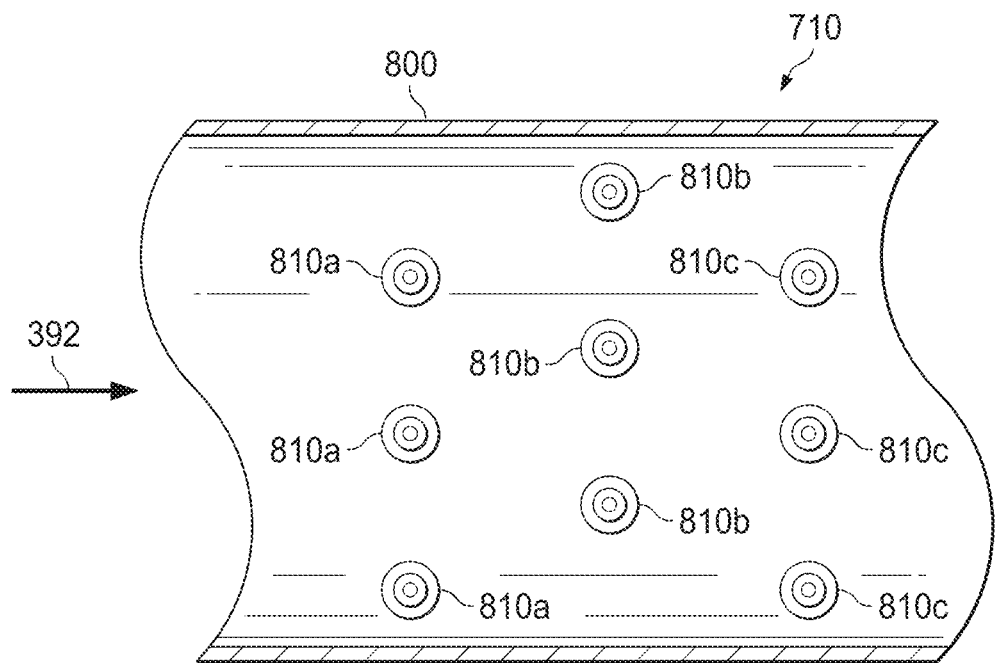
FIG. 7B is a simplified partial, cross-sectional side view parallel to the direction of fluid flow of an ultraviolet irradiation chamber according to an embodiment of the disclosure.
Figure 7C:
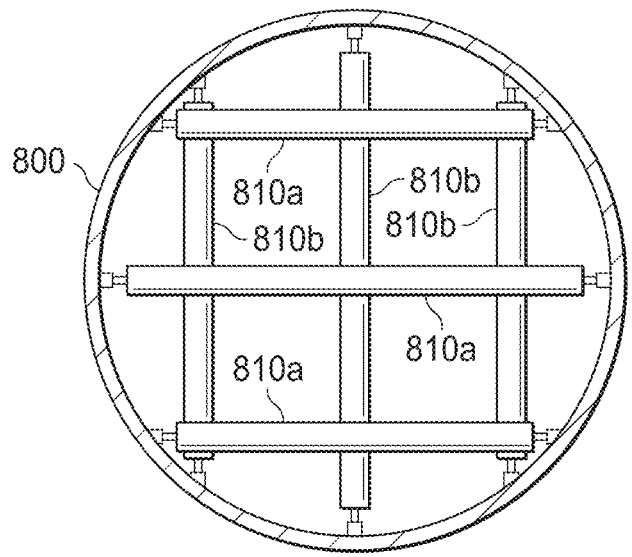
FIG. 7C is a simplified partial, cross-sectional end view orthogonal to the direction of fluid flow of an ultraviolet irradiation chamber according to an embodiment of the disclosure.

In an embodiment, the ultraviolet irradiation chamber 710 may comprise a suitable number of pulsed xenon ultraviolet lamps 810a oriented orthogonally (e.g., substantially perpendicular) with respect to the flowpath of the fluid stream in the conduit 800. For example, in the embodiment of FIG. 7A, the ultraviolet irradiation chamber 710 comprises a first group of pulsed xenon lamps 810a (e.g., three lamps), water stream 395a and a second group of pulsed xenon lamps 810b (e.g., three additional lamps), both of the first group 810a and the second group 810b being oriented substantially perpendicular to the direction of flow of the fluid moving via the flowpath defined by the conduit 800. In an alternative embodiment, one or more of the groupings of horizontal pulsed xenon ultraviolet irradiation lamps may comprise 1, 2, 4, 5, 6, 7, 8, or any other suitable number of pulsed xenon ultraviolet lamps 810. In the embodiment of FIG. 7A, the first group of pulsed xenon ultraviolet lamps 810a is offset from the second group of three pulsed xenon ultraviolet lamps 810a. For example, in the embodiment of FIG. 7A, the first group of lamps 810a is misaligned from the second group of lamps 810b with respect to the longitudinal flowpath defined by conduit 800 (e.g., oriented in substantially the same direction but at different heights or spacings across the diameter of the conduit 800). For example, as illustrated in the embodiment of FIG. 7A, the lamps of the first group 810a may be positioned horizontally within the conduit 800 and the second group 810b may be positioned horizontally within the conduit 800 such that the lamps of the second group 810b are aligned, with respect to the axial flowbore, with the spaces between the lamps of the first group. In an additional embodiment, additional and/or alternative configurations of lamps may further comprise a third (e.g., 810c as shown in FIG. 7B), fourth, fifth, sixth, seventh, eighth, ninth, tenth, or more group of lamps. In an additional and/or alternative embodiment, a plurality of lamps, for example, two, three, four, five, six, seven, eight, nine, ten, twelve, fourteen, sixteen, or an suitable number of lamps, may be oriented substantially perpendicular to the conduit and positioned in a substantially circular pattern.

In an additional and/or alternative embodiment, the first group of lamps 810a may be radially misaligned from the second group of lamps 810b. For example, referring to FIG. 7C, which illustrates an axial cross-section of an embodiment of an ultraviolet irradiation chamber 710, the ultraviolet irradiation chamber 710 may comprise a first group of pulsed xenon lamps 810a (e.g., three lamps), the lamps of the first group being horizontally-oriented, and second group of pulsed xenon lamps 810b (e.g., three lamps), the second group being vertically-oriented. For example, the lamps of the first group 810a may be oriented substantially perpendicular to lamps of the second group 810b (e.g., radially offset by about 90°). Alternatively, in an embodiment, the groups of lamps may be oriented in any suitable orientation. For example, a given group (e.g., row or column) of lamps may be radially (e.g., rotationally) offset from any adjacent group (e.g., row or column) by about 0°, 10°, 20°, 30°, 40°, 45°, 50°, 60°, 70°, 80°, or 90°. Not intending to be bound by theory, in an embodiment, such a configuration (e.g., a configuration having a plurality of groupings of lamps oriented substantially perpendicular to the flowpath and, optionally, with the two or more groups being at least partially offset, either radially or otherwise) may improve (e.g., increase) penetrance and/or exposure time by the ultraviolet light into the fluid stream and, thereby, improve (e.g., increase) the effectiveness of the ultraviolet light treatment, for example, by improving inactivation of any microorganisms present within the fluid.

Figure 8A:
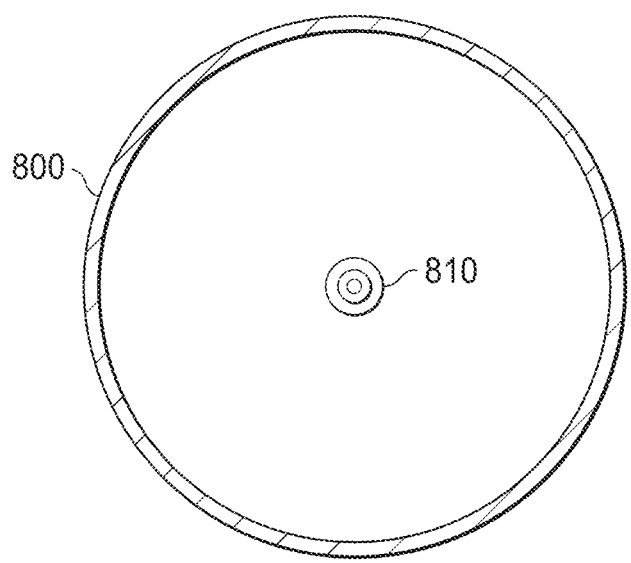
FIG. 8A is a simplified partial, cross-sectional end view orthogonal to the direction of fluid flow of an ultraviolet irradiation chamber according to an embodiment of the disclosure.
Figure 8B:
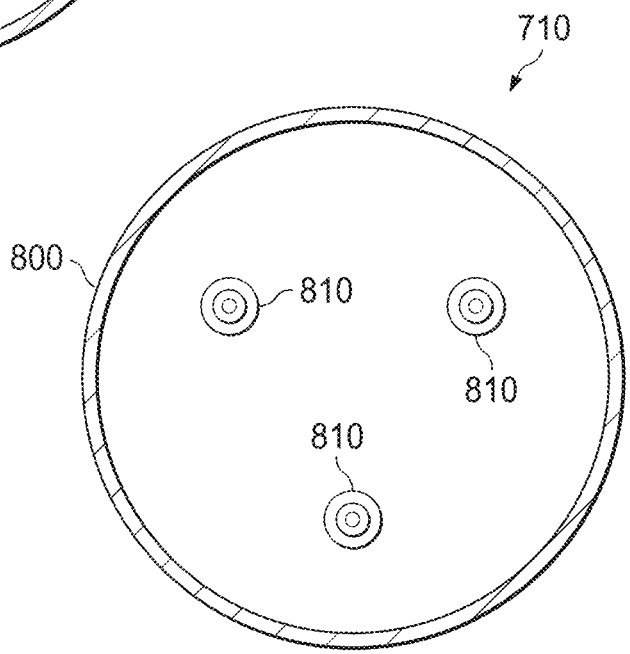
FIG. 8B is a simplified partial cross-sectional end view orthogonal to the direction of fluid flow of an ultraviolet irradiation chamber according to an embodiment of the disclosure.
Figure 8C:
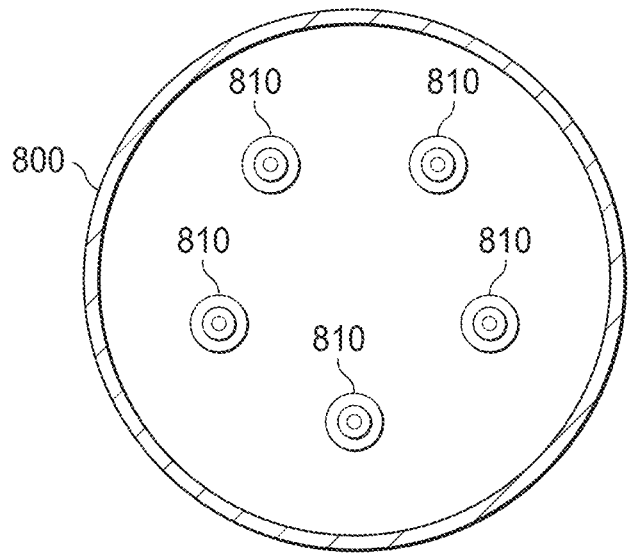
FIG. 8C is a simplified partial cross-sectional end view orthogonal to the direction of fluid flow of an ultraviolet irradiation chamber according to an embodiment of the disclosure.

In an alternative embodiment, the ultraviolet irradiation chamber 710 may comprise one or more pulsed xenon ultraviolet lamps 810 oriented substantially axially (e.g., parallel) with respect to the flowpath defined by the conduit. For example, referring to FIG. 8A, in an embodiment, the irradiation chamber comprises a pulsed xenon ultraviolet lamp 810 oriented longitudinally with respect to and positioned approximately within the center (e.g., radially) of the conduit 800, for example, such that the pulsed xenon ultraviolet lamp 810 is positioned substantially axially (e.g., parallel) with respect to the fluid flowpath (e.g., with respect to water stream 395a). In an additional and/or alternative embodiment, the ultraviolet irradiation chamber 710 may comprise one or more longitudinally oriented pulsed xenon ultraviolet lamps 810 radially offset from the center of the flowpath (e.g., alternatively or in addition to a lamp positioned substantially in the center of the flowpath, for example, as illustrated in FIG. 8A). For example, the ultraviolet irradiation chamber 710 may comprise three longitudinally oriented pulsed xenon ultraviolet lamps 810 (e.g., positioned within the flowpath in a substantially "triangular" pattern with respect to the longitude of the flowpath defined by the conduit 800, for example, as shown in FIG. 8B), alternatively five longitudinally oriented pulsed xenon ultraviolet lamps 810 (e.g., positioned within the flowpath in a substantially "star-shaped" pattern with respect to the longitude of the flowpath defined by the conduit 800, for example, as shown in FIG. 8C). Not intending to be bound by theory, in an embodiment, such a configuration (e.g., an axially oriented pulsed xenon ultraviolet lamp 810) may improve (e.g., increase) the exposure time of the fluid stream to the ultraviolet light and, thereby, improve (e.g., increase) the effectiveness of the ultraviolet light treatment, for example, by improving inactivation of any microorganisms present within the fluid.

In an embodiment, one or more of the configurations of lamps disclosed with respect to pulsed xenon lamps may also be employed utilizing a mercury vapor ultraviolet light source.

In the embodiment of FIG. 6, a fluid stream (for example, the untreated water stream 392) may be introduced into the ultraviolet irradiation unit 390, for example, into an ultraviolet irradiation chamber 710 of the ultraviolet irradiation unit, via conduit 495. As disclosed herein, the ultraviolet irradiation chamber 710 is configured to expose a water stream or a portion thereof to ultraviolet radiation, for example, from the one or more pulsed xenon ultraviolet lamps therein. Not intending to be bound by theory, treatment utilizing pulsed xenon ultraviolet irradiation lamps may improve (e.g., increase) penetration by the ultraviolet light into a turbid fluid water stream, relative to the penetration by ultraviolet light from a conventional mercury vapor-type lamp, and thereby allowing a fluid to be treated at a relatively higher flow rate. By way of example, a 10 watt continuous mercury vapor-type ultraviolet lamp may require about 10 Joules of energy per second. Comparatively, a pulsed xenon ultraviolet lamp may be configured such that 10 Joules of energy per second may be produced by a 1,000 watt pulse at 10 pulses per second with a pulse-duration of 1 millisecond. In such an example, the light intensity is 100 times greater for the pulsed xenon lamp than for the continuous mercury vapor-type lamp.

In an embodiment, because the light emitted by pulsed xenon ultraviolet lamps may provide better penetration in comparison to otherwise similar continuous mercury vapor lamps at the same ultraviolet dose (e.g., measured in millijoules per square centimeter, $mJ/cm^2$), the flow rate (e.g., measured in barrels per minute, barrels/min) via an ultraviolet irradiation unit utilizing pulsed xenon lamps may be maintained at a higher rate relative to the flow rate via an otherwise similar ultraviolet irradiation unit utilizing continuous mercury vapor ultraviolet lamps to achieve the same level of turbidity (e.g., measured in NTU) in a given stream. For example, an ultraviolet irradiation unit utilizing one or more pulsed xenon lamps may allow for an increase in flow rate of at least 10%, alternatively, at least 20%, alternatively, at least 30%, alternatively, at least 40%, alternatively, at least 50%, relative to the flow rate allowed by continuous mercury vapor lamps. If, for example, a water stream exhibiting a 20 percent transmittance (an alternative measurement for turbidity, having an inverse relationship such that 100 percent transmittance is the equivalent to 0 NTU) were to be treated so as to achieve approximately complete microorganism inactivation, an ultraviolet irradiation unit utilizing ultraviolet light from a continuous mercury vapor lamp source may be capable of treating such a fluid stream at, for example, a maximum flow rate of about 20 barrels per minute. By comparison, an ultraviolet irradiation unit utilizing light from a pulsed xenon lamp source may be capable of treating such a fluid stream at, for example, a maximum flow rate of up to about 40 barrels/min, alternatively, up to about 60 barrels/min, up to about 80 barrels/min, alternatively, up to about 100 barrels/min.

In another embodiment, because of the improved penetration by the light emitted by pulsed ultraviolet lamps, such pulsed ultraviolet lamps may exhibit improved efficiency, and thereby, decreased power consumption, relative to continuous mercury vapor lamps when utilized to achieve the same level of turbidity in a given stream. For example, an ultraviolet irradiation unit utilizing one or more pulsed xenon lamps may also allow for a decrease in power consumption of at least 10%, alternatively, at least 20%, alternatively, at least 30%, alternatively, at least 40%, alternatively, at least 50%, relative to the power consumed by continuous mercury vapor lamps.

Additional Disclosure

The following are nonlimiting, specific embodiments in accordance with the present disclosure:

Embodiment 1. A method of servicing a wellbore, comprising:

transporting a fluid treatment system to a wellsite;

accessing a water source proximate to the wellsite;

introducing a water stream from the water source into the fluid treatment system;

irradiating at least a portion of the water stream within the fluid treatment system, wherein the portion of the water stream is irradiated by exposing the portion of the water stream to ultraviolet light emitted from at least one pulsed ultraviolet lamp;

forming a wellbore servicing fluid from the irradiated water stream; and placing the wellbore servicing fluid into the wellbore.

Embodiment 2. The method of embodiment 1, wherein the fluid treatment system comprises an ultraviolet irradiation unit comprising at least one ultraviolet irradiation chamber.

Embodiment 3. The method of embodiment 2, wherein the at least one ultraviolet irradiation chamber comprises the at least one pulsed ultraviolet lamp.

Embodiment 4. The method of embodiment 3, wherein the at least one ultraviolet irradiation chamber comprises a first group of pulsed ultraviolet lamps and a second group of pulsed ultraviolet lamps, wherein the lamps of the first group of pulsed ultraviolet lamps and the lamps of the second group of pulsed ultraviolet lamps are positioned within the ultraviolet irradiation chamber about perpendicular to a flowpath of the water stream through the ultraviolet irradiation chamber.

Embodiment 5. The method of embodiment 4, wherein the first group of pulsed ultraviolet lamps is radially offset from the second group of pulsed ultraviolet lamps.

Embodiment 6. The method of embodiment 4, wherein the first group of pulsed ultraviolet lamps is axially offset from the second group of pulsed ultraviolet lamps.

Embodiment 7. The method of embodiment 3, wherein the at least one pulsed ultraviolet lamp is positioned within the ultraviolet irradiation chamber about parallel to a flowpath of the water stream through the ultraviolet irradiation chamber.

Embodiment 8. The method of embodiment 7, wherein the at least one pulsed ultraviolet lamp is positioned about in the center of the flowpath.

Embodiment 9. The method of embodiment 7, wherein the at least one pulsed ultraviolet lamp is offset from the center of the flowpath.

Embodiment 10. The method of one of embodiments 1 through 9, wherein irradiation of the water stream occurs at a rate that is at least 10% greater than a rate at which the water could be irradiated by exposing the portion of the water stream to ultraviolet light emitted from a continuous mercury vapor lamp so as to achieve an equivalent microorganism inactivation as in the irradiated stream.

Embodiment 11. The method of one of embodiments 1 through 10, wherein irradiation of the water stream occurs at a rate that is at least 20% greater than a rate at which the water could be irradiated by exposing the portion of the water stream to ultraviolet light emitted from a continuous mercury vapor lamp so as to achieve an equivalent microorganism inactivation as in the irradiated stream.

Embodiment 12. A method of servicing a wellbore, comprising:
accessing a water source to form a water stream;
irradiating at least a portion of the water stream to yield an irradiated water stream, wherein the portion of the water stream is irradiated by exposing the portion of the water stream to ultraviolet light emitted from a pulsed ultraviolet lamp;
forming a wellbore servicing fluid from the irradiated water stream; and placing the wellbore servicing fluid into the wellbore.

Embodiment 13. The method of embodiment 12, further comprising measuring turbidity of the water stream, turbidity of the irradiated stream, or both.

Embodiment 14. The method of embodiment 13, further comprising controlling a rate at which the portion of the water stream is irradiated based on the turbidity of the water stream, the turbidity of the irradiated stream, or combinations thereof.

Embodiment 15. The method of one of embodiments 12 through 14, wherein irradiation of the water stream occurs at a rate that is at least 10% greater than a rate at which the water could be irradiated by exposing the portion of the water stream to ultraviolet light emitted from a continuous mercury vapor lamp so as to achieve an equivalent microorganism inactivation as in the irradiated stream.

Embodiment 16. The method of one of embodiments 12 through 15, wherein irradiation of the water stream occurs at a rate that is at least 20% greater than a rate at which the water could be irradiated by exposing the portion of the water stream to ultraviolet light emitted from a continuous mercury vapor lamp so as to achieve an equivalent microorganism inactivation as in the irradiated stream.

Embodiment 17. A fluid treatment system for servicing a wellbore, comprising:
an ultraviolet irradiation unit, the ultraviolet irradiation unit comprising at least one ultraviolet irradiation chamber, the at least one ultraviolet irradiation chamber comprising at least one pulsed ultraviolet lamp;
at least one component of wellbore servicing equipment, the ultraviolet irradiation unit being in fluid communication with the at least one component of wellbore servicing equipment; and
a wellhead providing access to the wellbore, the at least one component of wellbore servicing equipment being in fluid communication with the wellhead.

Embodiment 18. The system of embodiment 17, wherein the at least one ultraviolet irradiation chamber comprises a first group of pulsed ultraviolet lamps and a second group of pulsed ultraviolet lamps, wherein the lamps of the first group of pulsed ultraviolet lamps and the lamps of the second group of pulsed ultraviolet lamps are positioned within the ultraviolet irradiation chamber about perpendicular to a flowpath of the water stream through the ultraviolet irradiation chamber.

Embodiment 19. The system of embodiment 18, wherein the first group of pulsed ultraviolet lamps is radially offset from the second group of pulsed ultraviolet lamps.

Embodiment 20. The system of embodiment 18, wherein the first group of pulsed ultraviolet lamps is axially offset from the second group of pulsed ultraviolet lamps.

Embodiment 21. The system of one of embodiments 17 through 20, wherein the at least one pulsed ultraviolet lamp is positioned within the ultraviolet irradiation chamber about parallel to a flowpath of the water stream through the ultraviolet irradiation chamber.

Embodiment 22. The system of embodiment 21, wherein the at least one pulsed ultraviolet lamp is positioned about in the center of the flowpath.

Embodiment 23. The system of embodiment 21, wherein the at least one pulsed ultraviolet lamp is offset from the center of the flowpath.

Embodiment 24. The system of one of embodiments 17 through 23, wherein the at least one component of wellbore servicing equipment comprises a blender, a manifold, a high-pressure pump, or combinations thereof.

While embodiments of the invention have been shown and described, modifications thereof can be made by one skilled in the art without departing from the spirit and teachings of the invention. For example, a portion of the wellbore servicing fluid placed in the wellbore 120 may be recycled, i.e., mixed with the water stream obtained from the water source 220 and treated in fluid treatment system 210. The embodiments described herein are exemplary only, and are not intended to be limiting. Many variations and modifications of the invention disclosed herein are possible and are within the scope of the invention. Where numerical ranges or limitations are expressly stated, such express ranges or limitations should be understood to include iterative ranges or limitations of like magnitude falling within the expressly stated ranges or limitations (e.g., from about 1 to about 10 includes, 2, 3, 4, etc.; greater than 0.10 includes 0.11, 0.12, 0.13, etc.). For example, whenever a numerical range with a lower limit, Rl, and an upper limit, Ru, is disclosed, any number falling within the range is specifically disclosed. In particular, the following numbers within the range are specifically disclosed: R=Rl+k*(Ru-Rl), wherein k is a variable ranging from 1 percent to 100 percent with a 1 percent increment, i.e., k is 1 percent, 2 percent, 3 percent, 4 percent, 5 percent, . . . 50 percent, 51 percent, 52 percent, . . . , 95 percent, 96 percent, 97 percent, 98 percent, 99 percent, or 100 percent. Moreover, any numerical range defined by two R numbers as defined in the above is also specifically disclosed. Use of the term "optionally" with respect to any element of a claim is intended to mean that the subject element is required, or alternatively, is not required. Both alternatives are intended to be within the scope of the claim. Use of broader terms such as comprises, includes, having, etc. should be understood to provide support for narrower terms such as consisting of, consisting essentially of, comprised substantially of, etc.

Accordingly, the scope of protection is not limited by the description set out above but is only limited by the claims which follow, that scope including all equivalents of the subject matter of the claims. Each and every claim is incorporated into the specification as an embodiment of the present invention. Thus, the claims are a further description and are an addition to the embodiments of the present invention. The discussion of a reference in the Detailed Description of the Embodiments is not an admission that it is prior art to the present invention, especially any reference that may have a publication date after the priority date of this application. The disclosures of all patents, patent applications, and publications cited herein are hereby incorporated by reference, to the extent that they provide exemplary, procedural or other details supplementary to those set forth herein.

What we claim is:

1. A method of servicing a wellbore, comprising:
transporting a fluid treatment system to a wellsite;
accessing a water source proximate to the wellsite;
introducing a water stream from the water source into the fluid treatment system;
irradiating at least a portion of the water stream within the fluid treatment system, wherein the portion of the water stream is irradiated by exposing the portion of the water stream to ultraviolet light emitted from at least one pulsed ultraviolet lamp;
forming a wellbore servicing fluid from the irradiated water stream, wherein forming the wellbore servicing fluid comprises mixing the irradiated water stream with an additive;
placing the wellbore servicing fluid into the wellbore; and
wherein the fluid treatment system comprises an ultraviolet irradiation unit comprising at least one ultraviolet irradiation chamber;
wherein the at least one ultraviolet irradiation chamber comprises the at least one pulsed ultraviolet lamp; and
wherein the at least one ultraviolet irradiation chamber comprises a first group of pulsed ultraviolet lamps and a second group of pulsed ultraviolet lamps, wherein the lamps of the first group of pulsed ultraviolet lamps and the lamps of the second group of pulsed ultraviolet lamps are positioned within the ultraviolet irradiation chamber about perpendicular to a flowpath of the water stream through the ultraviolet irradiation chamber.

2. The method. of claim 1, wherein the first group of pulsed ultraviolet lamps is radish offset from the second group of pulsed ultraviolet lamps.

3. The method of claim 1, wherein the first group of pulsed ultraviolet lamps is axially offset from the second group of pulsed ultraviolet lamps.

4. The method of claim 1, wherein the at least one pulsed ultraviolet lamp is positioned within the ultraviolet irradiation chamber about parallel to a flowpath of the water stream through the ultraviolet irradiation chamber.

5. The method of claim 4, wherein the at least one pulsed ultraviolet lamp is positioned about in the center of the flowpath 6. The method of claim 4 wherein the at least one pulsed ultraviolet lamp is offset from the center of the flowpath.

7. The method of claim 1, wherein irradiation of the water stream occurs at a rate that is at least 10% greater than a rate at which the water could be irradiated by exposing the portion of the water stream to ultraviolet light emitted from a continuous mercury vapor lamp so as to achieve an equivalent microorganism inactivation as in the irradiated stream.

8. The method of claim 1 wherein irradiation of the water stream occurs at a rate that is at least 20% greater than a rate at which the water could be irradiated by exposing the portion of the water stream to ultraviolet light emitted from a continuous mercury vapor lamp so as to achieve an equivalent microorganism inactivation as in the irradiated stream.

9. A method of servicing a wellbore, comprising:
accessing a water source to form a water stream;
providing at least one ultraviolet irradiation chamber, wherein the chamber comprises a first group of pulsed ultraviolet lamps and a second group of pulsed ultraviolet lamps, wherein the lamps of the first group of pulsed ultraviolet lamps and the lamps of the second group of pulsed ultraviolet lamps are positioned within the ultraviolet irradiation chamber about perpendicular to a flowpath of the water stream through the ultraviolet irradiation chamber;
irradiating at least a portion of the water stream to yield an irradiated water stream, wherein the portion of the water stream is irradiated by exposing the portion of the water stream to ultraviolet light emitted from the pulsed ultraviolet lamps;
forming a wellbore servicing fluid from the irradiated water stream, wherein forming the wellbore servicing fluid comprises mixing the irradiated water stream with an additive; and
placing the wellbore servicing fluid into the wellbore.

10. The method of claim 9, further comprising measuring turbidity of the water stream, turbidity of the irradiated stream, or both.

11. The method of claim 10, further comprising controlling a rate at which the portion of the water stream is irradiated based on the turbidity of the water stream, the turbidity of the irradiated stream, or combinations thereof.

12. The method of claim 9, wherein irradiation of the water stream occurs at a rate that is at least 10% greater than a rate at which the water could be irradiated by exposing the portion of the water stream to ultraviolet light emitted from a continuous mercury vapor lamp so as to achieve an equivalent microorganism inactivation as in the irradiated stream.

13. The method of claim 9, wherein irradiation of the water stream occurs at a rate that is at least 20% greater than a rate at which the water could be irradiated by exposing the portion of the water stream to ultraviolet light emitted from a continuous mercury vapor lamp so as to achieve an equivalent microorganism inactivation as in the irradiated stream.

14. A fluid treatment system for servicing a wellbore, comprising:
an ultraviolet irradiation unit, the ultraviolet irradiation unit comprising at least one ultraviolet irradiation chamber, the at least one ultraviolet irradiation chamber comprising at least one pulsed ultraviolet lamp;

a blender configured to mix the irradiated water stream with an additive, the ultraviolet irradiation unit being in fluid communication with the blender;

a wellhead providing access to the wellbore, the blender being in fluid communication with the wellhead; and wherein the at least one ultraviolet irradiation chamber comprises a first group of pulsed ultraviolet lamps and a second group of pulsed ultraviolet lamps, wherein the lamps of the first group of pulsed ultraviolet lamps and the lamps of the second group of pulsed ultraviolet lamps are positioned within the ultraviolet irradiation chamber about perpendicular to a flowpath of the water stream through the ultraviolet irradiation chamber.

15. The system of claim 14, wherein the first group of pulsed ultraviolet lamps is radially offset from the second group of pulsed ultraviolet lamps.

16. The system of claim 14, wherein the first group of pulsed ultraviolet lamps is axially offset from the second group of pulsed ultraviolet laws.

17. The system of claim 14, wherein the at least one pulsed Ultraviolet lamp is positioned within the ultraviolet irradiation chamber about parallel to a flowpath of the water stream through the ultraviolet irradiation chamber.

18. The system, of claim 17, wherein the at least one pulsed ultraviolet lamp is positioned about in the center of the flowpath.

19. The system of claim 17, wherein the at least one pulsed ultraviolet lamp is offset from the center of the flowpath.

20. The system of claim 14, wherein the system further comprises a blender, a manifold, a high-pressure pump, or combinations thereof.

* * * * *